(12) United States Patent
Yamazaki

(10) Patent No.: US 9,285,925 B2
(45) Date of Patent: Mar. 15, 2016

(54) CIRCUIT SUBSTRATE, ELECTRO-OPTICAL DEVICE WITH INPUT FUNCTION, AND ELECTRONIC APPARATUS

(71) Applicant: Seiko Epson Corporation, Tokyo (JP)

(72) Inventor: Katsunori Yamazaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/532,553

(22) Filed: Nov. 4, 2014

(65) Prior Publication Data

US 2015/0145833 A1 May 28, 2015

(30) Foreign Application Priority Data

Nov. 22, 2013 (JP) ................................. 2013-242310

(51) Int. Cl.
*G06F 3/042* (2006.01)
*G06F 3/038* (2013.01)

(52) U.S. Cl.
CPC .............. *G06F 3/042* (2013.01); *G06F 3/0386* (2013.01)

(58) Field of Classification Search
CPC ....... G06F 3/0421; G06F 3/0412; G06F 3/042
USPC ..................... 345/87–100, 107, 173–180, 207
See application file for complete search history.

(56) References Cited

U.S. PATENT DOCUMENTS

| | | | |
|---|---|---|---|
| 2003/0052840 | A1 | 3/2003 | Shannon |
| 2005/0045881 | A1 | 3/2005 | Nakamura et al. |
| 2006/0267948 | A1 | 11/2006 | Takahashi |
| 2010/0149089 | A1 | 6/2010 | Kim |
| 2010/0328275 | A1 | 12/2010 | Yamazaki |
| 2012/0242634 | A1 | 9/2012 | Maruyama et al. |
| 2012/0280939 | A1* | 11/2012 | Ahn ....................... G06F 3/0412 345/175 |
| 2012/0299816 | A1* | 11/2012 | Lee ................... G02F 1/133528 345/156 |
| 2013/0063404 | A1* | 3/2013 | Jamshidi Roudbari . G06F 3/044 345/204 |
| 2013/0135257 | A1* | 5/2013 | Lee .......................... G06F 3/042 345/175 |
| 2013/0154990 | A1* | 6/2013 | Hamada ................... G09G 3/20 345/173 |
| 2013/0229401 | A1* | 9/2013 | Kim ..................... G09G 3/3648 345/212 |
| 2014/0049500 | A1* | 2/2014 | Chen ..................... G06F 3/0412 345/174 |
| 2014/0139490 | A1* | 5/2014 | Hwang ................... G06F 3/042 345/175 |
| 2014/0292722 | A1* | 10/2014 | Hong ....................... G06F 3/042 345/175 |
| 2015/0084928 | A1* | 3/2015 | Wyrwas ................ G06F 3/0421 345/175 |

FOREIGN PATENT DOCUMENTS

| | | |
|---|---|---|
| JP | 2005-512113 A | 4/2005 |
| JP | 2006-003857 A | 1/2006 |
| JP | 2006-330649 A | 12/2006 |
| JP | 2009-244638 A | 10/2009 |
| JP | 2010-145992 A | 7/2010 |
| JP | 2011-008173 A | 1/2011 |
| JP | 2012-216192 A | 11/2012 |

* cited by examiner

*Primary Examiner* — Kimnhung Nguyen
(74) *Attorney, Agent, or Firm* — ALG Intellectual Property, LLC

(57) ABSTRACT

A circuit substrate according to the invention includes a pixel circuit that is provided for a pixel which is arranged in a display area provided on a substrate, in which the pixel circuit includes a pixel selection transistor; a data line that is connected to a source of the pixel selection transistor; a scan line that is connected to a gate of the pixel selection transistor; a pixel electrode; a memory unit that is connected to the pixel electrode and the pixel selection transistor, and that can switch an output state of a potential with respect to the pixel electrode; and a light sensor that can rewrite an output, which is retained in the memory unit by light input, with respect to the pixel electrode.

20 Claims, 13 Drawing Sheets

|  | BLACK DISPLAY | WHITE DISPLAY |
|---|---|---|
| Tr2 | Voff | Von |
| MEM | 0 | 1 |
| Pix | 0 (Vcom) | Vdrv |

CIRCUIT SUBSTRATE, ELECTRO-OPTICAL DEVICE WITH INPUT FUNCTION, AND ELECTRONIC APPARATUS

BACKGROUND

1. Technical Field

The present invention relates to a circuit substrate, an electro-optical device with input function, and an electronic apparatus.

2. Related Art

In recent years, a display device in which a display circuit and a coordinate detection circuit of light input type are separately formed for each pixel has been known (for example, refer to JP-A-2006-3857).

In the related art described above, when rewriting a part in which a coordinate is designated by light, signal data is fetched one row at a time, and a top apparatus must rewrite a display part in a predetermined driving sequence based on the data. For this reason, for example, there is a problem that trajectory display at the time of tracing with a light pen cannot be quickly displayed.

SUMMARY

An advantage of some aspects of the invention is that a circuit substrate, an electro-optical device with input function, and an electronic apparatus which can quickly display writing performed by light input are provided.

According to a first aspect of the invention, a circuit substrate includes a pixel circuit that is provided for each pixel which is arranged in a display area provided on a substrate, in which the pixel circuit includes a pixel selection transistor, a data line that is connected to a source of the pixel selection transistor, a scan line that is connected to a gate of the pixel selection transistor, a pixel electrode, a memory unit that is connected to the pixel electrode and the pixel selection transistor and that can switch an output state of a potential with respect to the pixel electrode, and a light sensor that can rewrite an output which is retained in the memory unit by light input with respect to the pixel electrode.

According to the circuit substrate relating to the first aspect, it is possible to directly rewrite an output with respect to the pixel electrode which is retained in the memory unit by the light input, by means of the light sensor provided in the pixel. Thus, for example, if the circuit substrate is employed in the electro-optical device that drives an electro-optical material layer using a potential difference which is generated between the pixel electrode and the counter electrode, it is possible to quickly display a trajectory produced by handwriting using a light pen.

In the first aspect, the circuit substrate may further include a driving transistor that is disposed between the pixel electrode and the pixel selection transistor and that can switch an input state of a potential with respect to the pixel electrode, in which the light sensor and the memory may be respectively provided between wires that connect a gate of the driving transistor to a drain of the pixel selection transistor.

According to this configuration, by switching the output from the memory unit, a driving state of the driving transistor can be controlled. Thus, it is possible to control an input state of a potential with respect to the pixel electrode, based on the light input.

In the first aspect, the light sensor may be configured to diode-connect the transistor.

According to this configuration, it is possible to manufacture the light sensor in the same process as that of the pixel selection transistor and the driving transistor. Thus, the manufacturing process becomes simple, and cost reduction is achieved.

In the first aspect, the light sensor may be configured by a portion of a plurality of transistors that configures the memory unit.

According to this configuration, by configuring the light sensor with a transistor configuring the memory unit, it is possible to reduce the number of components.

In the first aspect, the circuit substrate may further include a switch circuit that is provided between the memory unit and the pixel electrode, and a first control line and a second control line which are connected to the switch circuit, in which a potential may be input to the pixel electrode via one of the first control line and the second control line, which is selected based on an output of the memory unit.

According to this configuration, it is possible to switch a potential which is input to the pixel electrode by the light input.

In the first aspect, the pixel electrode may form an opening, and the light sensor may be disposed so as to overlap with the opening in a planar view.

According to this configuration, it is possible to satisfactorily input light to the light sensor via the opening formed in the pixel electrode.

In the first aspect, the circuit substrate may further include a filter that has a light blocking property with respect to light of visible light range, and that is provided at a position corresponding to the opening in a planar view.

According to this configuration, it is possible to prevent the light sensor from malfunctioning by the visible light.

In the first aspect, the circuit substrate may further include a reading unit that reads retained information of a potential of the memory unit via the data line.

According to this configuration, the retained information of the potential of the memory unit can be acquired by reading. Thus, it is possible to acquire information with regard to a coordinate position by the light input.

According to a second aspect of the invention, an electro-optical device with input function includes a circuit substrate according to the first aspect, a counter substrate that has a counter electrode which is arranged so as to oppose a pixel electrode of the circuit substrate, and an electro-optical material layer that is interposed between the circuit substrate and the counter electrode.

According to the electro-optical device with input function relating to the second aspect, it is possible to display a trajectory produced by handwriting using the light pen or the like.

In the second aspect, the electro-optical material layer may be an electrophoretic layer.

According to this configuration, an electrophoretic display device which can quickly display the trajectory produced by the handwriting using the light pen is provided.

According to a third aspect of the invention, an electronic apparatus includes an electro-optical device with input function according to the second aspect.

According to the electronic apparatus relating to the third aspect, the electro-optical device with input function corresponding to handwriting input using the light pen or the like is included, and the electronic apparatus itself also becomes a high value-added apparatus with handwriting input function.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings. In the present embodiment, an electro-optic device which is driven by an active matrix method will be described as an example. In addition, in the following drawings, for ease of understanding of each configuration, the scale, the number or the like of each structure may be set differently from the actual structure.

First Embodiment

Figure 1:
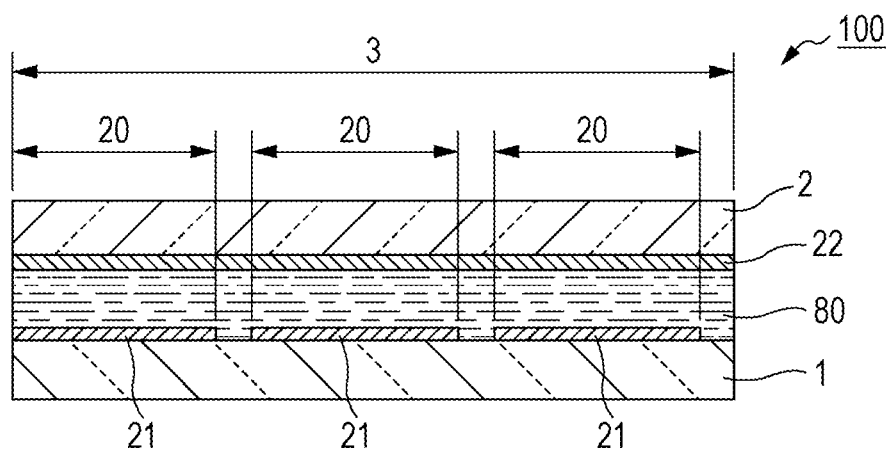
FIG. 1 is a cross-sectional view illustrating a schematic configuration of a liquid crystal display device.

FIG. 1 is a cross-sectional view illustrating a schematic configuration of a liquid crystal display device which is a first embodiment of an electro-optical device according to the invention.

As illustrated in FIG. 1, the liquid crystal display device 100 includes an element substrate 1 which is configured with a circuit substrate according to the invention, a counter substrate 2, and a liquid crystal layer 80 (electro-optical material layer) which is interposed between the element substrate 1 and the counter substrate 2. The element substrate 1 is formed so as to be larger than the counter substrate 2. A display portion 3 includes a plurality of pixels 20. The display portion 3 is formed in an area in which the element substrate 1 and the counter substrate 2 overlap each other in a planar view.

A plurality of pixel electrodes 21 is formed on one surface side of the element substrate 1. Each pixel electrode 21 is formed so as to oppose the pixel 20. In addition, in the element substrate 1, elements (pixel selection transistor, driving transistor, retention capacitor, light sensor or the like), which will be described later, are formed for each pixel 20, but those are omitted in FIG. 1.

A counter electrode 22 is formed on one surface side of the counter substrate 2. The counter electrode 22 is provided in common with respect to the plurality of pixels 20. The element substrate 1 and the counter substrate 2 are configured with a light permeability substrate which is formed by, for example, glass, plastic or the like. The pixel electrode 21 and the counter electrode 22 are configured with a transparent electrode, for example, ITO or the like.

In the present embodiment, the liquid crystal display device 100 is configured with a panel of light permeability type. That is, the liquid crystal display device 100 includes a back light (not illustrated). In addition, the liquid crystal display device 100 is not limited to the panel of light permeability type, and may be configured with a panel of light reflection type. In this case, the pixel electrode 21 is configured with metal material with a light reflective property, such as Al.

In the present embodiment, the liquid crystal layer 80 is driven by an electric field (longitudinal electric field) in a liquid crystal layer thickness direction, which is generated between the pixel electrode 21 and the counter electrode 22. As a driving method of liquid crystal, a twisted nematic (TN) method is used representatively, but other methods, such as an optically compensated birefringence (OCB) method, a vertical alignment (VA) method, an in-plane switching (IPS) method, a fringe field switching (FFS) method or the like may be used.

Figure 2A:
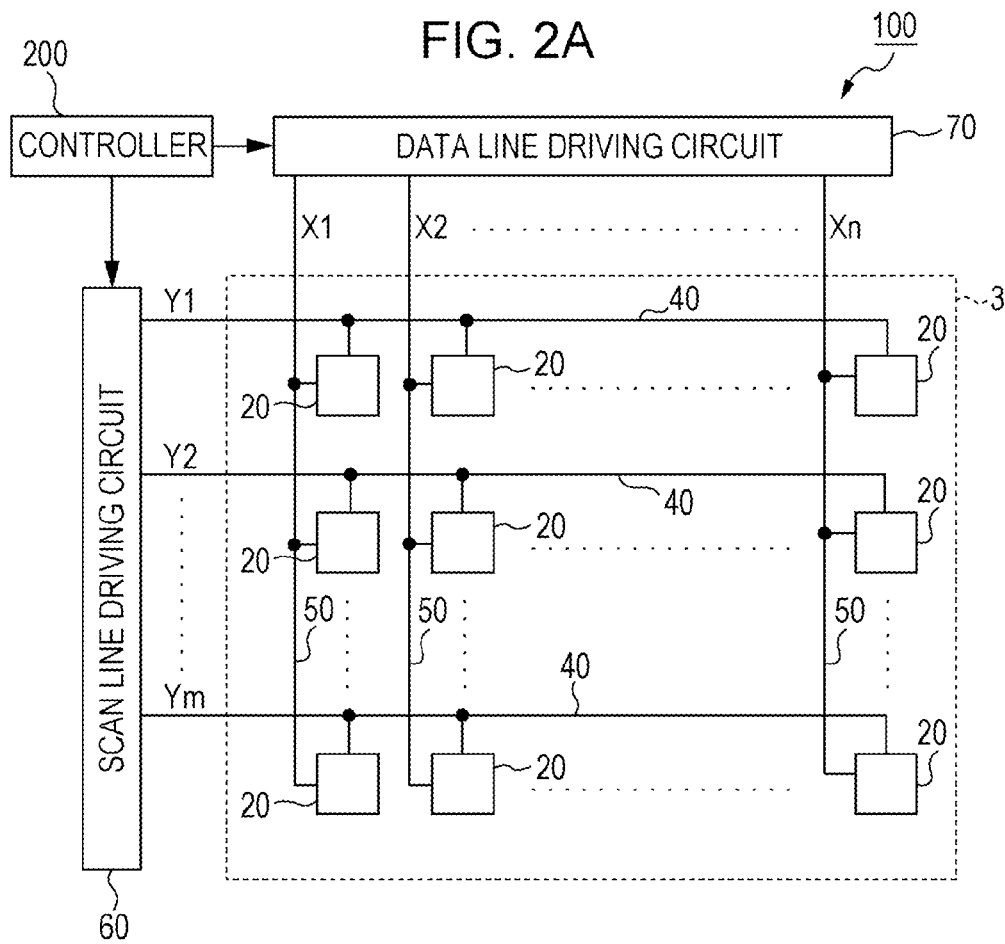
FIGS. 2A and 2B are diagrams illustrating a circuit configuration of a liquid crystal display device.
Figure 2B:
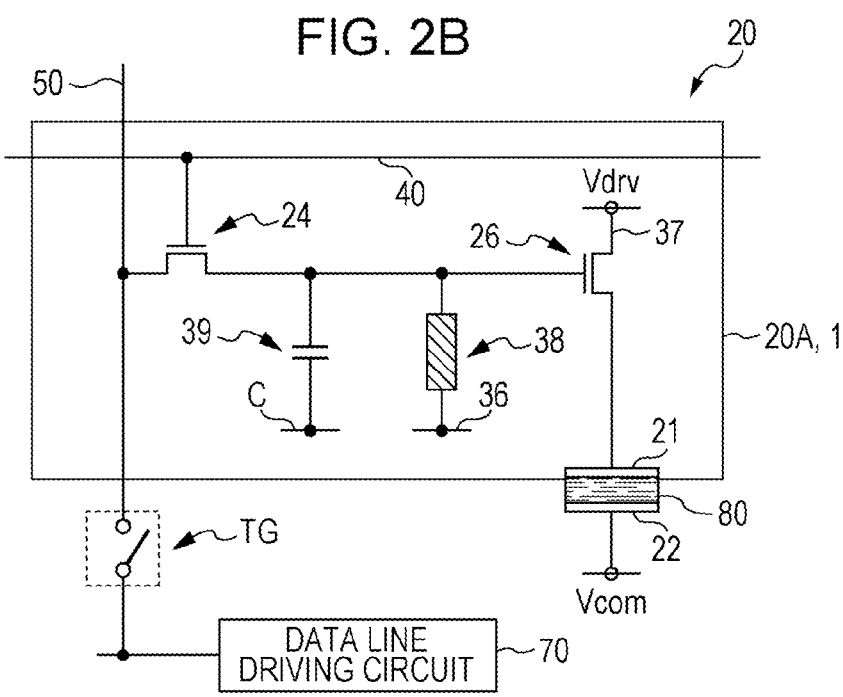

FIG. 2A is a circuit configuration diagram of the liquid crystal display device, and FIG. 2B is a diagram illustrating a circuit configuration of the pixel 20.

As illustrated in FIG. 2A, the liquid crystal display device 100 includes the display portion 3 in which the plurality of pixels 20 is arranged, a scan line driving circuit 60, and a data line driving circuit 70.

In the display portion (display area) 3, a plurality of scan lines 40 (Y1, Y2, ..., Ym) which is extended from the scan line driving circuit 60, and a plurality of data lines 50 (X1, X2, ..., Xn) which is extended from the data line driving circuit 70, are formed. The pixels 20 are disposed so as to correspond to intersection portions of the scan lines 40 and the data lines 50, and each pixel 20 is respectively connected to the scan line 40 and the data line. 50.

In addition, in the periphery of the display portion 3, the scan line driving circuit 60, the data line driving circuit 70, and a controller 200 are disposed. The controller 200 is a control device which comprehensively controls each of the circuits, based on image data or a synchronizing signal which is supplied from a top device. The scan line driving circuit 60, the data line driving circuit 70, and the controller 200 are mounted on an area which is protruded to be longer than the counter substrate 2, on the element substrate 1.

As illustrated in FIG. 2B, each pixel 20 includes a pixel circuit 20A which is provided in the element substrate 1, a counter electrode 22, and the liquid crystal layer 80 which is interposed between the counter electrode 22 and a pixel electrode 21. The pixel circuit 20A includes a selection transistor (pixel selection transistor) 24, a driving transistor 26, the pixel electrode 21, a light sensor 38, and a memory (memory unit) 39. The pixel circuit 20A is formed in the element substrate 1.

The selection transistor 24 is a pixel switching element which is formed by, for example, a negative metal oxide semiconductor (NMOS)-thin film transistor (TFT). A gate of the selection transistor 24 is connected to the scan line 40, a source thereof is connected to the data line 50, and a drain terminal is connected to the memory 39.

That is, as illustrated in FIG. 1, the gate of the selection transistor 24 which forms the pixel 20 is connected to each scan line 40 in a set unit for each column, and is connected to the scan line driving circuit 60. Then, the source of the selection transistor 24 which forms the pixel 20 is connected to each data line 50 in a set unit for each column, and is connected to the data line driving circuit 70.

One electrode of the memory 39 is connected to the selection transistor 24, and the other electrode thereof is connected to a capacitance line C. That is, the memory 39 is disposed between the drain of the selection transistor 24 and a gate of the driving transistor 26.

The memory 39 can output a potential according to retained content to the pixel electrode 21. For this reason, the memory 39 can switch an output state of a potential with respect to the pixel electrode 21 by rewriting the retained content.

The light sensor 38 is configured with, for example, a photo register, a photo diode, a photo transistor, or the like. In the present embodiment, the light sensor 38 is configured with a photo diode, as described later. The light sensor 38 is disposed between the selection transistor 24 and the driving transistor 26. In the present embodiment, the light sensor 38 is disposed between the memory 39 and a gate of the driving transistor 26. The one electrode of the light sensor 38 is connected to the memory 39 and the driving transistor 26, and the other electrode is connected to a signal line 36. The light sensor 38 rewrites a potential of the signal line 36 to the memory 39. For example, a potential which turns off the gate of the driving transistor 26 is input to the signal line 36. That is, as described later, the light sensor 38 can rewrite an output (output potential) with respect to the pixel electrode 21, which is retained in the memory 39 by a light input.

In addition, in the present embodiment, a case is taken as an example, in which the memory 39 and the light sensor 38 are disposed in this sequence between the selection transistor 24 and the driving transistor 26, but the invention is not limited to this, and the memory 39 may be disposed between one terminal of the light sensor 38 and the gate of the driving transistor 26.

The driving transistor 26 is a switching element which is formed by, for example, a negative metal oxide semiconductor (NMOS)-thin film transistor (TFT). A gate of the driving transistor 26 is connected to the light sensor 38, a source thereof is connected to a driving power supply line 37, and a drain terminal thereof is connected to the pixel electrode 21. The driving power supply line 37 supplies a driving potential to the pixel electrode 21. That is, the driving transistor 26 can switch an input state of a potential with respect to the pixel electrode 21, according to a switching state (ON or OFF state) of the gate. In the embodiment, for example, a driving potential Vdrv from the driving power supply line 37 has a rectangular voltage wave which has duty 50% and whose voltage is symmetric with respect to a potential Vcom which is input from a driving power supply not illustrated in the counter electrode 22.

A predetermined potential Vcom from the driving power supply (not illustrated) is input to the counter electrode 22. The liquid crystal display device 100 can display a desired image on each pixel 20, by driving liquid crystal molecules of the liquid crystal layer 80 based on a potential difference between the counter electrode 22 and the pixel electrode 21.

In the present embodiment, each data line 50 can be connected or disconnected by a transfer gate TG. The transfer gate TG is driven by the controller 200.

In addition, in the present embodiment, while the data line driving circuit 70 supplies a predetermined image signal to each pixel 20 via the data line 50, predetermined information (retained memory in the memory 39) from each pixel 20 via the data line 50 can be read by the controller (reading unit) 200. In addition, a driving control of the data line driving circuit 70 is performed by the controller 200, and the read information is transmitted to the controller 200.

Figures 3, 4:
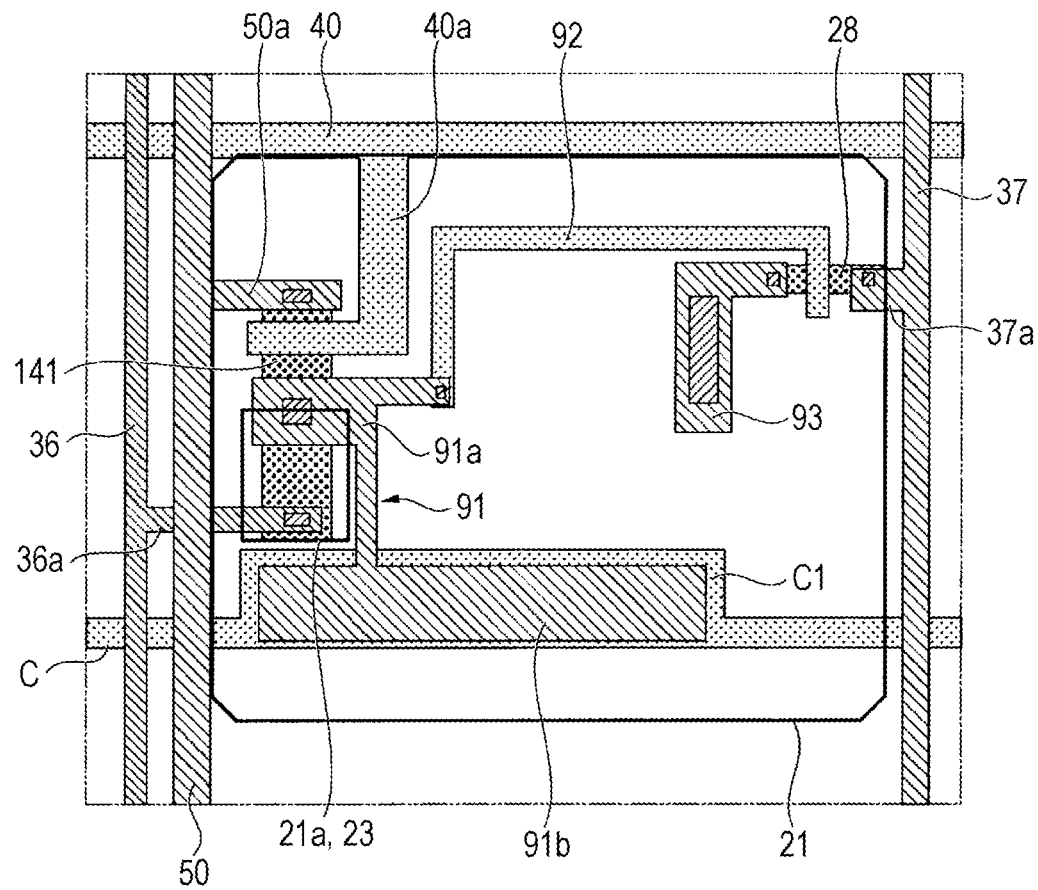
FIG. 3 is a planar view illustrating one pixel circuit of a liquid crystal display device.
FIG. 4 is an operation explanatory diagram of a pixel circuit.

FIG. 3 is a planar view specifically illustrating a configuration of one pixel 20 of the liquid crystal display device 100 according to the present embodiment.

A wire which is provided in the periphery of the pixel 20 will be first described. As illustrated in FIG. 3, in the periphery of the pixel 20, the scan line 40, the data line 50, the driving power supply line 37, the capacitance line C, and signal line 36 are provided. Such a wire is formed over the plurality of pixels 20.

Next, wires provided within the pixel 20, and a configuration of a semiconductor layer will be described. In a bottom layer of the pixel 20, semiconductor layers 141 and 28 are formed. All the semiconductor layers are configured with semiconductor materials such as silicon. In addition, of course, it does not matter that each semiconductor layer is configured by materials different from each other. The semiconductor layer 141 configures a portion of the selection transistor 24 and the photo diode (light sensor 38).

On upper layers of the semiconductor layer 141 and 28, the scan line 40, the data line 50, the driving power supply line 37, the capacitance line C, the signal line 36, and wires 91, 92 and 93 are formed. Such wires or the like are configured by metal with high conductivity, such as copper, aluminum, silver or the like.

In the scan line 40, an extending portion 40a which configures the gate electrode of the selection transistor 24 is formed.

In the data line 50, an extending portion 50a is formed. The extending portion 50a is connected to the semiconductor layer 141 via a contact hole. The extending portion 50a configures a source electrode of the selection transistor 24.

In the driving power supply line 37, an extending portion 37a is formed. The extending portion 37a is connected to the semiconductor layer 28 via a contact hole. The extending portion 37a configures a source electrode of the driving transistor 26. The above-described wire 93 is connected to the semiconductor layer 28 via a contact hole, and configures a drain electrode of the driving transistor 26. The pixel electrode 21 is connected to the wire 93 via a contact hole.

In the capacitance line C, a widening portion C1 which forms one electrode of the memory 39 is formed. The wire 91 includes a contact portion 91a and a capacitance forming portion 91b. The contact portion 91a is connected to the semiconductor layer 141 via a contact hole, and forms a drain electrode of the selection transistor 24. In addition, the contact portion 91a forms one electrode of the light sensor 38 (photo diode). The capacitance forming portion 91b is disposed so as to overlap with the widening portion C1 of the capacitance line C in a planar view. The capacitance forming portion 91b forms the memory 39 positioned between the widening portion C1 and an insulating layer interposed between the widening portion C1 and the capacitance forming portion 91b. The above-described wire 92 is connected to the wire 91 (extending portion which extends from the contact portion 91a) via a contact hole, and is routed so as to overlap with the semiconductor layer 28 in a planar view. The wire 92 forms a gate electrode of the driving transistor 26.

In the signal line 36, an extending portion 36a is formed. The extending portion 36a overlaps with the semiconductor layer 141 in planar view, and is connected to the semiconductor layer 141 via a contact hole. The extending portion 36a configures the other electrode of the light sensor 38 (photo diode).

In the present embodiment, the pixel electrode 21 is disposed on the pixel circuit 20A. In addition, in the pixel electrode 21, an opening 21a is formed at a position (position which overlaps with the light sensor 38 in a planar view) corresponding to the light sensor 38, and at least a portion of the light sensor 38 is disposed so as not to overlap with the pixel electrode 21. As a result, the light sensor 38 can satisfactorily introduce light incident from an upper surface side of the pixel electrode 21.

Subsequently, an operation of the liquid crystal display device 100 according to the present embodiment will be described. FIG. 4 is a view illustrating states of potentials of the driving transistor 26, the memory 39, and the pixel electrode 21 at the time of driving. In the embodiment, a normally black liquid crystal is taken as an example so as to be described, in which when an effective voltage to the liquid crystal layer 80 is zero, the pixel 20 performs black display, and when an effective voltage is not zero, the pixel 20 performs white display.

Image Display

When an image display is performed, the controller 200 sets the data line driving circuit 70 so as to supply a predetermined signal to a bus. A width of the bus is set to, for example, one bit.

When an image display is performed, the controller 200 drives the scan line driving circuit 60, selects the scan lines 40 in sequence, and turns on the selection transistor 24 in the selected row. In addition, columns are configured by a plurality of data lines 50, and rows are configured by a plurality of scan lines 40.

In this state, the controller 200 sequentially selects the transfer gates TG, and activates the data line 50 and the data line driving circuit 70 which are in the selected column. As a result, the controller 200 can output an image signal from the data line driving circuit 70 via the data line 50.

Here, when the pixel 20 in the selected row and the selected column performs black display, the data line driving circuit 70 supplies a signal potential (image data) Voff which turns off the driving transistor 26 to the data line 50. Meanwhile, when a predetermined pixel 20 performs white display, the data line driving circuit 70 supplies a signal potential (image data) Von which turns on the driving transistor 26 to the data line 50.

Then, the signal potential (Von or Voff) on the data line 50 is charged in the memory 39 to be retained there. In FIG. 4, as a stored state of the memory 39, when the retained potential is Voff, the stored state is represented by "0", and when the retained potential is Von, the stored state is represented by "1".

Here, if a column to be selected is changed, the transfer gate TG which is in a state of ON up to now becomes OFF, but the potential of the data line 50 is maintained only for a certain period of time by a parasitic capacitance or the like of the data line 50. For this reason, the state of the retained memory in the memory 39 does not change.

In addition, if selection of the data lines 50 in all the columns is completed, the scan line 40 in the next row is selected. At this time, the selection transistors 24 in the previous row, which are selected up to now, are all turned off, and thereby, even when a potential to the data line 50 changes hereinafter according to potential input to other pixels 20, the potential retained in the memory 39 does not change.

By repeating the operation described above, storage setting with respect to the pixels 20 is completed. For this reason, as illustrated in the table of FIG. 4, in the pixel 20 in which the stored data (MEM) is "1", the selection transistor 24 (Tr2) enters an ON state (Von). If the selection transistor 24 is in an ON state, a driving potential Vdrv of the driving power supply line 37 is input to the pixel electrode 21 (Pix). That is, a rectangular voltage wave which has a duty 50% and whose voltage is symmetric with respect to a potential Vcom is input to the pixel electrode 21 as the driving potential Vdrv. For this reason, an effective voltage which is not 0 V is applied to the liquid crystal layer 80 of the pixel 20 to which the driving potential Vdrv is input, and thereby the liquid crystal layer 80 which is a normally black liquid crystal performs white display.

Meanwhile, in the pixel 20 in which the stored data (MEM) is "0", the selection transistor 24 (Tr2) turns off (Voff). If the selection transistor 24 turns off, the pixel electrode 21 (Pix) becomes the same potential as the potential Vcom of the counter electrode 22. For this reason, an effective voltage of 0 V is applied to the liquid crystal layer 80 of the pixel 20 in which a potential is not generated between the counter electrode 22 and the pixel electrode 21, and thereby the liquid crystal layer 80 which is a normally black liquid crystal performs black display.

However, the liquid crystal display device 100 according to the present embodiment performs light input, and thereby the light sensor 38 provided in each pixel 20 can rewrite the memory retained in the memory 39. As a result, a display state of the pixel 20 according to the light input can be changed to a predetermined state. Hereinafter, an operation of changing display of the pixel 20 performed by light input will be described.

Light Input Operation

Figure 5:
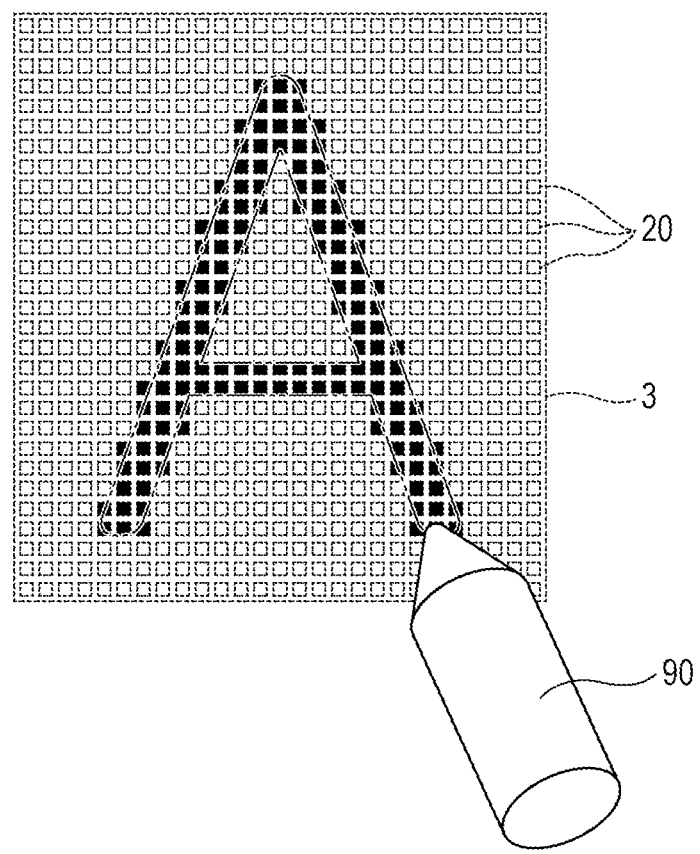
FIG. 5 is a view for explaining an operation of inputting light.

FIG. 5 is a view for describing an operation of performing light input with respect to the display portion 3 of the liquid crystal display device 100. As illustrated in FIG. 5, a light pen 90 is used for the light input to the display portion 3. FIG. 5 illustrates a state where a character A of the English alphabet is written on the display portion 3 using the light pen.

The light pen 90 emits light LT with a predetermined wavelength from its tip. The wavelength of the light LT which is emitted from the light pen 90 is not particularly limited, and may be visible light or infrared light. In addition, it is preferable that when infrared light is emitted from the light pen 90, a visible light filter 23 be disposed, which selectively shields a position (position overlapping with the light sensor 38 in a planar view) corresponding to the opening 21a of the pixel electrode 21 illustrated in FIG. 3 from visible light components. By doing so, visible light is input to the opening 21a, and thereby, it is possible to prevent the light sensor 38 from malfunctioning, and to perform a light writing operation with high reliability.

When handwriting input is performed by the light pen 90, the selection transistor 24 turns off, and a potential according to the retained memory in the memory 39 is input to the gate of the driving transistor 26. Hereinafter, for simplicity of description, it is assumed that when handwriting input is performed by the light pen 90, all the pixels 20 of the display portion 3 perform white display. That is, the retained memory in the memory 39 of all the pixels 20 is "1".

As illustrated in FIG. 5, if the light pen 90 approaches the display portion 3, resistance of the light sensor 38 of the pixel 20 to which the light LT of the light pen 90 is irradiated is lowered. As a result, a potential which is input to the signal line 36 and turns off the driving transistor 26 is written to the memory 39, and the retained memory is rewritten as "0" from "1".

Here, in the pixel 20 in which the retained memory in the memory 39 is changed from "1" to "0", the driving transistor 26 turns on. As a result, the pixel 20 which is irradiated with light is selectively changed to black display from white display, and a black mark is written to the display portion 3. In this way, a display state of the display portion 3 is changed to black display, and thereby the trajectory of the light pen 90 can be displayed.

Coordinate Data Reading Operation

In addition, the liquid crystal display device 100 according to the present embodiment can read the retained memory in the memory 39 via the data line 50. The read data (retained memory) is transmitted to the controller 200. The controller 200 transmits the transmitted data to a top apparatus. The top apparatus compares the image data (that is, image data which is displayed on the display portion 3 before the light input is performed) which is supplied from a top device with the retained memory which is read, detects a pixel position which is changed from white to black, and can detect an input position performed by the light pen 90.

In addition, in the above description, the entire display portion 3 can perform white display, and a case where only the pixel 20 traced by the light pen 90 performs black display is taken as an example, but the invention is not limited to this. For example, an image can be displayed in advance on the display portion 3, and the trajectory of the light pen 90 may be displayed on the displayed image. Here, in a pixel 20 in which black display is originally performed, the retained memory is not changed according to the light input performed by the light pen 90. In this case, the controller 200 may interpolate position information of other pixels 20 which are changed from white display to black display.

Hereinafter, a reading operation of coordinate data from the memory 39 performed by the controller 200 will be described.

When data reading is performed, the controller 200 sets the data line driving circuit 70 so as to pick out a signal on a bus. A width of the bus is set to, for example, one bit. Then, the controller 200 sequentially selects the scan lines 40, and turns on the selection transistor 24 in the selected row. In this state, the controller 200 sequentially selects the transfer gates TG. Then, the controller 200 can read the data (retained memory) stored in the memory 39 of the pixel 20 in the selected row and the selected column via the data line 50 and the data line driving circuit 70. The controller 200 transmits the read data to a top apparatus. In this way, the retained memory in the memory 39 is incorporated into a top apparatus.

If the controller 200 completes selection of all columns, the same operation of selecting the next row is repeated, and thereby it is possible to pick out memory state of all the pixels 20.

In addition, in the present embodiment, for the sake of a brief description, a bus with one bit width is described, but the bus may have, for example, four, eight, or sixteen bit width.

As described above, according to the liquid crystal display device 100 of the present embodiment, the retained memory in the memory 39 is rewritten directly by the light sensor 38 which is provided within the pixel 20, and thereby it is possible to control the driving state of the driving transistor 26. Thus, the input state of a potential with respect to the pixel electrode 21 is controlled by light input, and thereby it is possible to provide the liquid crystal display device 100 which can quickly display the trajectory made by handwriting using the light pen 90 or the like. In addition, it is possible to read coordinate data from the memory 39.

Second Embodiment

Subsequently, an electro-optical device according to a second embodiment will be described. The electro-optical device according to the present embodiment is greatly different from the first embodiment in that the electro-optical device includes an electrophoretic layer as an electro-optical layer. In the following description, the same symbols or reference numerals will be attached to the same members and configurations as in the first embodiment, and description thereof will be omitted.

Figure 6A:
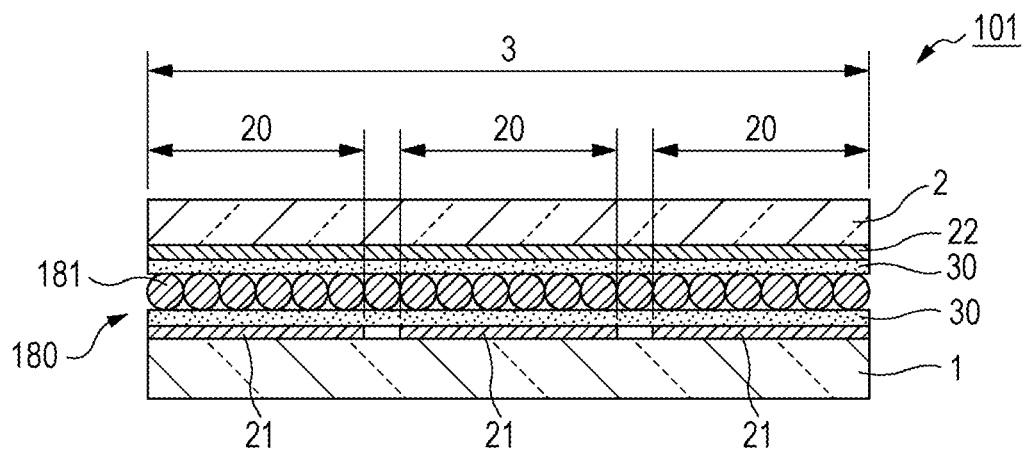
FIGS. 6A and 6B are cross-sectional views illustrating a schematic configuration of an electrophoretic display device.
Figure 6B:
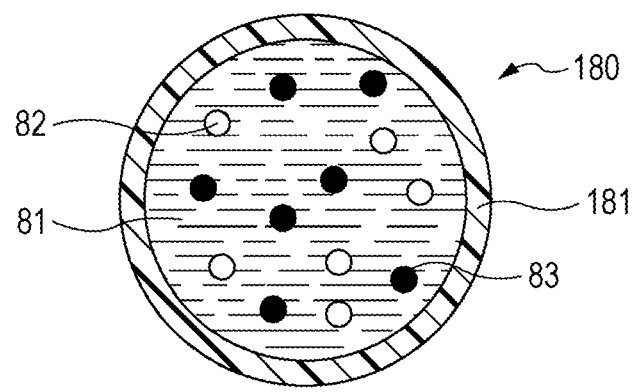

FIG. 6A is a cross-sectional view illustrating a schematic configuration of an electrophoretic display device 101 according to the second embodiment of the electro-optical device of the invention, and FIG. 6B is a configuration view of a microcapsule.

As illustrated in FIG. 6A, the electrophoretic display device 101 includes the element substrate 1, the counter substrate 2, and an electrophoretic layer (electro-optical layer) 180 disposed between the element substrate 1 and the counter substrate 2.

The plurality of pixel electrodes 21 is formed on one surface side of the element substrate 1. The counter electrode 22 is formed on one surface side of the counter substrate 2. The counter electrode 22 is provided commonly with respect to the plurality of pixels 20. The electrophoretic layer 180 is configured with a plurality of microcapsules 181. The electrophoretic layer 180 is fixed between both substrates 1 and 2, using an adhesive layer 30. That is, the adhesive layer 30 is formed between the electrophoretic layer 180 and both substrates 1 and 2.

In addition, the adhesive layer 30 on the counter substrate 2 side is required to be bonded to a surface of the pixel electrode 21, but the adhesive layer 30 on the counter substrate 2 side is not essential. This is because when the counter electrode 22, the plurality of microcapsules 181 and the adhesive layer 30 on the counter substrate 2 side are manufactured in advance with respect to the counter substrate 2 through a consistent manufacturing process, and then those are treated as an electrophoretic sheet, only the adhesive layer 30 on the element substrate 1 side is necessary.

As illustrated in FIG. 6B, the microcapsule 181 has a particle size of approximately 50 µm, for example, and is formed by polymethyl methacrylate, acrylic resin such as polyethyl methacrylate, urea resin, or polymer resin with light permeability such as arabic gum. The microcapsule 181 is interposed between the counter electrode 22 and the pixel electrode 21 described above, and a plurality of the microcapsules 181 is arranged in a matrix within one pixel 20. In order to fill the periphery of the microcapsule 181, a binder (not illustrated) to fix the microcapsule 181 is provided.

An inside of the microcapsule 181 is filled with a dispersion medium 81, a plurality of white particles 82 as electrophoretic particles, and a plurality of black particles 83.

The white particles 82 are particles (polymer or colloid) formed of white pigments such as titanium oxide, zinc oxide, or antimony trioxide, and are negatively charged to be used, for example. The black particles 83 are particles (polymer or colloid) formed of black pigments such as aniline black or carbon black, and are positively charged to be used, for example. As occasion demands, an electrolyte, an surfactant, metal soap, a resin, rubber, oil, varnish, a charge control agent consisting of particles such as compound, a titanium coupling agent, an aluminum coupling agent, a dispersant such as silane coupling agent, a lubricant, a stabilizer, or the like can be added to such pigments.

As the dispersion medium 81, water, alcohol solvents (methanol, ethanol, isopropanol, butanol, octanol, methyl cellosolve, and the like), esters (ethyl acetate, butyl acetate, and the like), ketones (acetone, methyl ethyl ketone, methyl isobutyl ketone, and the like), aliphatic hydrocarbons (pentane, hexane, octane, and the like), alicyclic hydrocarbon (cyclohexane, methylcyclohexane, and the like), aromatic hydrocarbons (benzenes (hexyl benzene, heptyl benzene, octyl benzene, nonyl benzene, decyl benzene, undecyl benzene, dodecyl benzene, tridecyl benzene, tetradecyl benzene, and the like) with benzene, toluene, xylene, and a long chain alkyl group), halogenated hydrocarbons (methylene chloride, chloroform, carbon tetrachloride, 1,2-dichloroethane, and the like), silicone oil, and the like can be exemplified, and the dispersion medium 81 may be other oils. Such materials can be used alone or in mixture, and furthermore, surface active agents such as carboxylic acid salt may be blended.

For example, in the electrophoretic display device 101, based on such configurations, if a voltage is input between the pixel electrode 21 and the counter electrode 22, electrophoretic particles (white particles 82 and black particles 83), as described later, perform electrophoresis towards either the pixel electrode 21 or the counter electrode 22, according to electric field being generated between the pixel electrode 21 and the counter electrode 22.

Figure 7A:
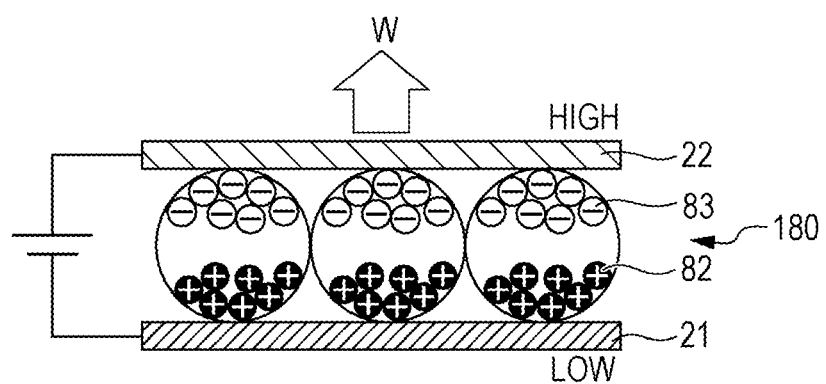
FIGS. 7A and 7B are operation explanatory diagrams of an electrophoretic element.
Figure 7B:
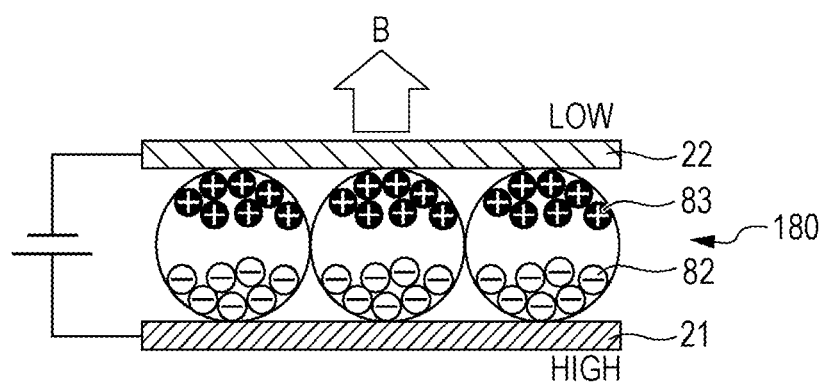

FIGS. 7A and 7B are operation explanatory diagrams of the electrophoretic elements (white particles 82 and black particles 83). FIG. 7A illustrates a case where white display of the pixel 20 is performed, and FIG. 7B illustrates a case where black display of the pixel 20 is performed.

In a case of white display illustrated in FIG. 7A, the counter electrode 22 is retained as a relatively high potential (High), and the pixel electrode 21 is retained as a relatively low potential (Low). As a result, while the white particles 82 which are negatively charged are attracted to the counter electrode 22, the black particles 83 which are positively charged are attracted to the pixel electrode 21. As a result, if the pixel 20 is viewed from the counter electrode 22 side which is a display surface side, white (W) is recognized.

Meanwhile, in a case of black display illustrated in FIG. 7B, the counter electrode 22 is retained as a relatively low potential (Low), and the pixel electrode 21 is retained as a relatively high potential (High). As a result, while the black particles 83 which are positively charged are attracted to the counter electrode 22, the white particles 82 which are negatively charged are attracted to the pixel electrode 21. As a result, if the pixel is viewed from the counter electrode 22 side, black (B) is recognized.

Even in the electrophoretic display device 101 according to the present embodiment, the pixel circuit 20A illustrated in FIG. 2B is included in each pixel 20.

Figure 8:
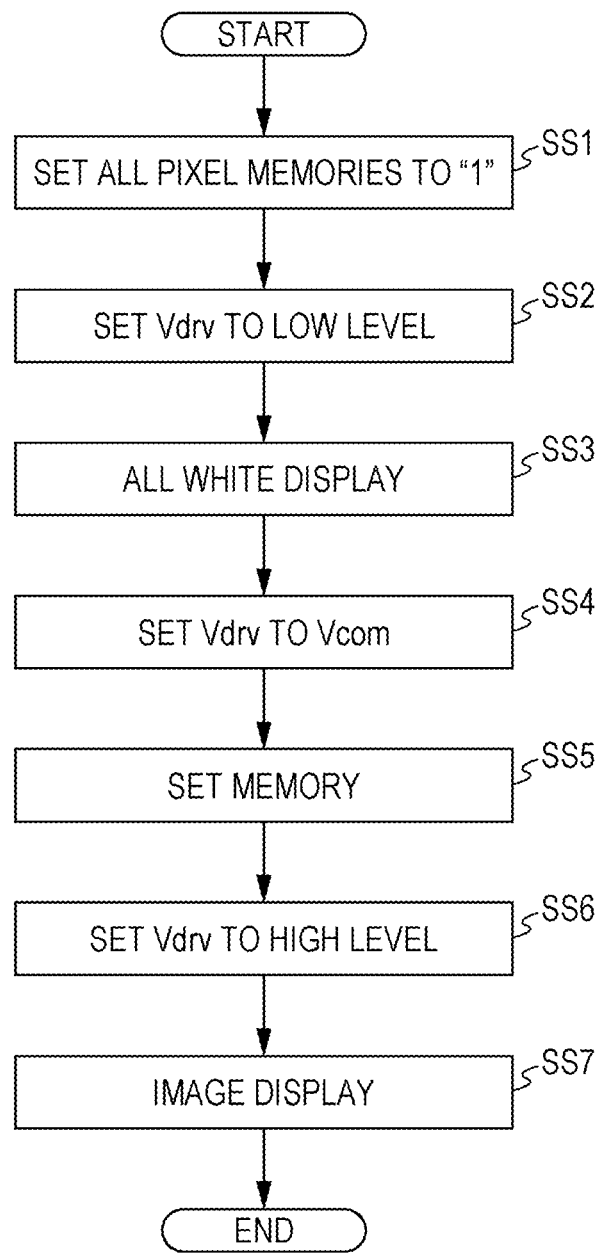
FIG. 8 is a chart illustrating flow of an image display operation of an electrophoretic display device.

Subsequently, an operation of the electrophoretic display device 101 according to the present embodiment will be described. FIG. 8 is a chart illustrating flow of an image display operation of the electrophoretic display device 101. As illustrated in FIG. 8, the electrophoretic display device 101 executes step SS1 in which the retained memories of the entire memory 39 are set to "1", step SS2 in which the driving potential Vdrv is set to a low potential (Low), step SS3 in which all pixels 20 are set to white display, step SS4 in which the driving potential Vdrv is set to Vcom, step SS5 in which the written data is retained in the memory 39 of each pixel 20, step SS6 in which the driving potential Vdrv is set to a high potential (High), and step SS7 in which image display is performed based on the retained memory which is retained in the memory 39.

In addition, in step SS1, the controller 200 sets the retained memories of the memory 39 of all pixels 20 to "1". Here, "1" of the retained memory means that the driving transistor 26 turns on.

Since the operation of retaining data in the memory 39 is the same as that of the first embodiment, description thereof will be omitted. After the retained memories of entire memory 39 are set to "1", the processing proceeds to step SS2.

In step SS2, the controller 200 controls a potential which is supplied to the driving power supply line 37, and thereby, a negative potential, that is, a relatively low potential (Low) with respect to the potential Vcom of the counter electrode 22 is input to the pixel electrode 21 via the driving power supply line 37 as the driving potential Vdrv. As a result, the voltages of all pixel electrodes 21 become negative potentials with respect to the potential Vcom of the counter electrode 22. Thus, in all pixels 20, the black particles 83 move towards the pixel electrodes 21, and the white particles 82 move towards the counter electrodes 22 (refer to FIG. 7A). Thus, all pixels 20 perform white display (step SS3).

After all pixels 20 perform white display, the processing proceeds to step SS4.

In step SS4, the controller 200 controls the potential which is supplied to the driving power supply line 37, and thereby, the same potential as the potential Vcom of the counter electrode 22 is input to the pixel electrode 21 via the driving power supply line 37 as the driving potential Vdrv. As a result, a potential difference between the pixel electrode 21 and the counter electrode 22 becomes zero, and thus, the electrophoretic particles (white particles 82 and black particles 83) in all pixels 20 do not move.

Subsequently, the processing proceeds to step SS5. In step SS5, the controller 200 retains the written data in the memories 39 of each pixel 20. Specifically, the retained memory in the memory 39 of the pixel 20 which is change to black display is set to "1", and the retained memory in the memory 39 of the pixel 20 which is maintained as white display is set to "0". After memory writing to all pixels 20 is completed, the processing proceeds to step SS6.

In step SS6, the controller 200 controls the potential which is supplied to the driving power supply line 37, and thereby, a positive potential, that is, a relatively high potential (High) with respect to the potential Vcom of the counter electrode 22 is input to the pixel electrode 21 via the driving power supply line 37 as the driving potential Vdrv.

Subsequently, the processing proceeds to step SS7. In step SS7, an image display is performed based on the retained memory which is retained in each memory 39. In this case, since the driving transistor 26 turns on in the pixel 20 in which the retained memory is "1" and which performs black display, a positive potential with respect to the potential Vcom of the counter electrode 22 is input to the pixel electrode 21. As a result, white particles 82 move towards the pixel electrode 21 side, and the black particles 83 move towards the counter electrode 22 side, and thus, the pixel 20 performs black display (refer to FIG. 7B). Meanwhile, since the driving transistor 26 turns off in the pixel electrode 21 of the pixel 20 in which the retained memory is "0" and which performs white display, a potential difference is not generated between the pixel electrode 21 and the counter electrode 22, and thus, the electrophoretic particles (white particles 82 and black particles 83) do not move and the white display is maintained as it is.

Subsequently, in the electrophoretic display device 101 according to the present embodiment, a case of performing light input will be described. Hereinafter, for the sake of a brief description, it is assumed that when the light input is performed, all pixels 20 of the display portion 3 perform white display. That is, the retained memories of the memories 39 of all pixels 20 are set to "0".

In the present embodiment, the potential which turns on the driving transistor 26 is set so as to be supplied to the signal line 36. In addition, when the light input is performed, the selection transistor 24 turns off, and a potential according to the retained memory in the memory 39 is input to the driving transistor 26. In addition, the driving potential Vdrv which becomes a negative potential (low potential) with respect to the potential Vcom of the counter electrode 22 is input to the driving power supply line 37.

If the light pen 90 (refer to FIG. 5) approaches the display portion 3, resistance of the light sensor 38 of the pixel 20 to which the light LT (refer to FIG. 5) of the light pen 90 is irradiated is lowered. As a result, a potential which is input to the signal line 36 and turns on the driving transistor 26 is written to the memory 39, and the retained memory is rewritten as "1" from "0". As a result, the pixel 20 which is irradiated with light is selectively changed to black display from white display, and a black mark is written to the display portion 3. In this way, a display state of the display portion 3 is changed to black display, and thereby the trajectory of the light pen 90 can be displayed.

In addition, in the electrophoretic display device 101 according to the present embodiment, after moving of the electrophoretic particles is completed, a continual voltage application is not required. For this reason, when the light pen 90 is in contact with the display portion 3, either the light pen 90 or the electrophoretic display device 101 generates a signal which transfers that fact, and thereby, a positive voltage with respect to Vcom, which is synchronized to the signal, is supplied as the driving potential Vdrv for a predetermined time, and thereafter the voltage may be the same potential as Vcom.

In addition, since an operation of reading coordinate data from the memory 39 performed by the controller 200 is the same as that of the first embodiment, description thereof will be omitted.

As described above, even in the electrophoretic display device 101 according to the present embodiment, the input state of a potential with respect to the pixel electrode 21 is controlled by the light input, and thus, it is possible to quickly display the trajectory produced by handwriting using the light pen 90 or the like. In addition, it is possible to read the coordinate data from the memory 39.

In addition, in the above-described embodiment, a case where a plurality of microcapsules 181 is disposed as an electrophoretic layer is exemplified, but the invention is not limited to this. The invention may be configured in such a manner that the electrophoretic layer is divided into a plurality of cells by barrier walls, and each of the plurality of cells is filled with the dispersion medium 81, a plurality of white particles 82 as electrophoretic particles, and a plurality of black particles 83.

Third Embodiment

Subsequently, an electro-optical device according to a third embodiment will be described. The electro-optical device according to a third embodiment includes a pixel circuit which is greatly different from that of the electrophoretic display device 101 according to the second embodiment. In the following description, the same symbols or the reference numerals are attached to the same members and configurations as those of the second embodiment, and description thereof will be omitted.

Figure 9:
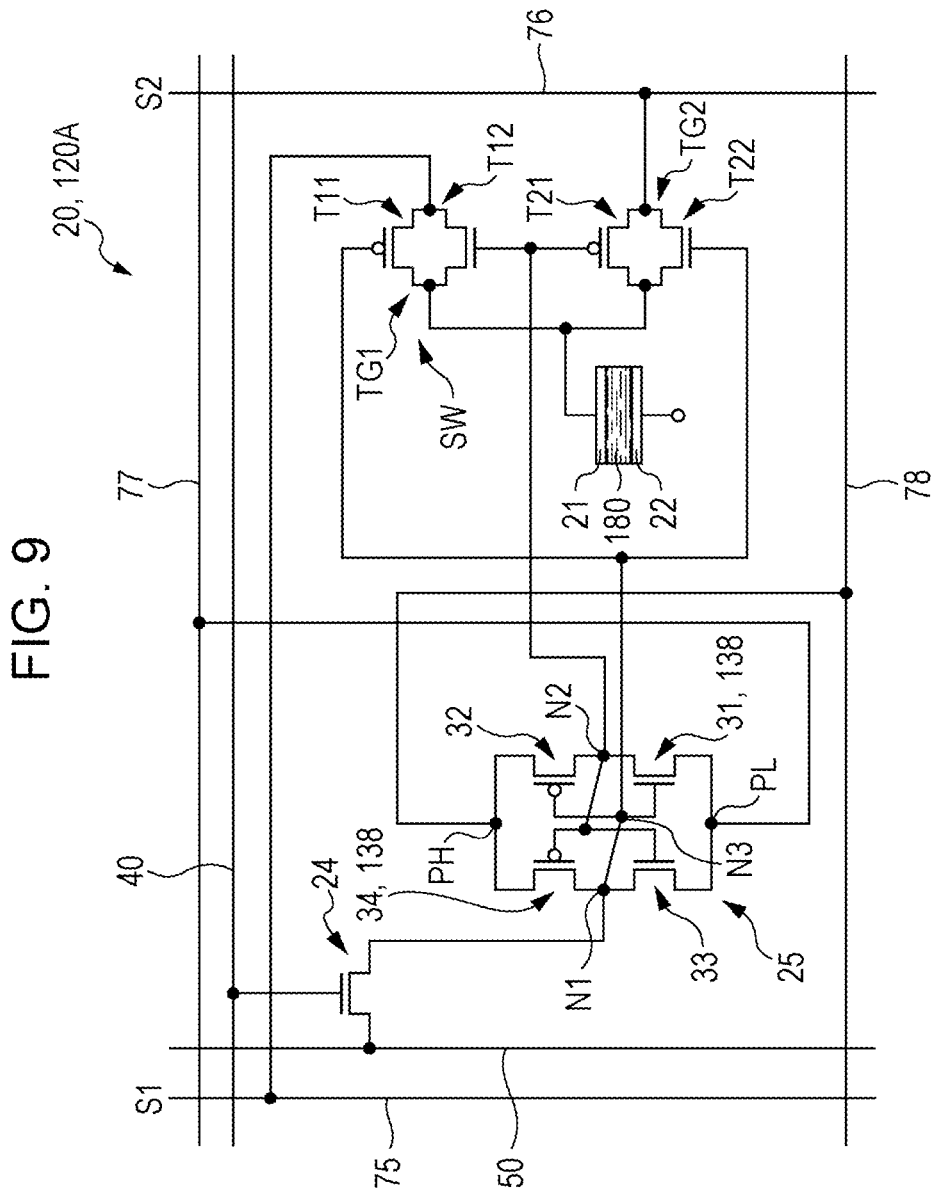
FIG. 9 is diagram illustrating a circuit configuration of a pixel of an electrophoretic display device.

FIG. 9 is a diagram illustrating a circuit configuration of the pixel 20 of the electrophoretic display device according to the present embodiment. As illustrated in FIG. 9, the pixel 20 includes the selection transistor 24, a latch circuit (memory unit) 25, a switch circuit SW for potential control, the pixel electrode 21, the counter electrode 22, and the electrophoretic layer 180, and in such units, a pixel circuit 120A is configured without the counter electrode 22 and the electrophoretic layer 180. The switch circuit SW includes transfer gates TG1 and TG2.

In the present embodiment, a data line 50 is connected to a source terminal of the selection transistor 24, and an input terminal N1 of the latch circuit 25 is connected to a drain terminal of the selection transistor 24. The selection transistor 24 is used so as to connect the data line 50 to the latch circuit 25, while a selection signal is input via the scan line 40, thereby inputting an image signal input via the data line 50 to the latch circuit 25.

The latch circuit 25 is configured with two P channel transistors 32 and 34, and two N channel transistors 31 and 33. A high potential power supply line 78 is connected to a source side of the P channel transistors 32 and 34, and a low potential power supply line 77 is connected to a source side of the N channel transistors 31 and 33. Thus, the source side of the P channel transistors 32 and 34 becomes a high potential power supply terminal PH of the latch circuit 25, and the source side of the N channel transistors 31 and 33 becomes a low potential power supply terminal PL of the latch circuit 25.

The latch circuit 25 includes an input terminal N1 which is connected to a drain side of the selection transistor 24, and a first output terminal N2 and a second output terminal N3 which are connected to the switch circuit SW.

A drain side of the P channel transistor 34 and a drain side of the N channel transistor 33 of the latch circuit 25 function as the input terminal N1 of the latch circuit 25. The input terminal N1 is connected to a drain side of the selection transistor 24, and is connected to the second output terminal N3 (a gate portion of the P channel transistor 32 and a gate portion of the N channel transistor 31) of the latch circuit 25.

Furthermore, the second output terminal N3 is connected to transfer gates TG1 and TG2.

The drain side of the P channel transistor 32 and the drain side of the N channel transistor 31 of the latch circuit 25 function as the first output terminal N2 of the latch circuit 25.

The first output terminal N2 is connected to a gate portion of the P channel transistor 34 and a gate portion of the N channel transistor 33, and is connected to the transfer gates TG1 and TG2.

The latch circuit 25 is a circuit corresponding to a static random access memory (SRAM) cell. The latch circuit 25 is used so as to retain an image signal which is transmitted from the selection transistor 24, and to input the image signal to the switch circuit SW. Based on the image signal which is input from the latch circuit 25, the switch circuit SW selects either a first control line 75 or a second control line 76, and functions as a selector which connects the selected control line to the pixel electrode 21. At this time, according to a level of the image signal, only one of the transfer gates TG1 and TG2 operates.

The transfer gate TG1 includes a P channel transistor T11 of field effect type and an N channel transistor T12 of field effect type. A source terminal of the P channel transistor T11 and a source terminal of the N channel transistor T12 are connected together, and the two source terminals are connected to the first control line 75. A drain terminal of the P channel transistor T11 and a drain terminal of the N channel transistor T12 are connected together, and the two drain terminals are connected to the pixel electrode 21. A gate terminal of the P channel transistor T11 is connected to the input terminal N1 of the latch circuit 25, and a gate terminal of the N channel transistor T12 is connected to the first output terminal N2 of the latch circuit 25.

The transfer gate TG2 includes a P channel transistor T21 of field effect type and an N channel transistor T22 of field effect type. A source terminal of the P channel transistor T21 and a source terminal of the N channel transistor T22 are connected together, and the two source terminals are connected to the second control line 76. A drain terminal of the P channel transistor T21 and a drain terminal of the N channel transistor T22 are connected together, and the two drain terminals are connected to the pixel electrode 21.

A gate terminal of the P channel transistor T21 is connected to both the gate terminal of the N channel transistor T12 of the transfer gate TG1, and the output terminal N2 of the latch circuit 25. A gate terminal of the N channel transistor T22 is connected to both the gate terminal of the P channel transistor T11 of the transfer gate TG1, and the input terminal N1 of the latch circuit 25. In addition, the first control line 75 and the second control line 76 are disposed in parallel with respect to each pixel 20.

For example, if an image signal with a low level (L: a potential close to the potential of the low potential power supply line 77) is input to the input terminal N1 of the latch circuit 25, a signal with a high level (H: a potential close to the potential of the high potential power supply line 78) is output from the first output terminal N2, and thus, the N channel transistor T12 connected to the first output terminal N2 operates, and in addition, the P channel transistor T11 connected to the second output terminal N3 (input terminal N1) operates, thereby driving the transfer gate TG1. Thus, the first control line 75 is electrically connected to the pixel electrode 21.

Meanwhile, if an image signal with a high level (H) is input to the input terminal N1 of the latch circuit 25, a signal with a low level (L) is output from the first output terminal N2, and thus, the P channel transistor T21 connected to the first output terminal N2 operates, and in addition, the N channel transistor T22 connected to the second output terminal N3 (input terminal N1) operates, thereby driving the transfer gate TG2. Thus, the second control line 76 is electrically connected to the pixel electrode 21.

Then, via a transfer gate which operates, the first control line 75 or the second control line 76 is electrically connected to the pixel electrode 21, and thereby a potential is input to the pixel electrode 21.

In the present embodiment, a portion of a plurality of transistors which configures the latch circuit 25 is used as a light sensor. Specifically, in the present embodiment, the P channel transistor 34 and the N channel transistor 31 are used as the light sensor 138. That is, when light is incident from the light pen 90 (FIG. 5), a leakage current flowing through the P channel transistor 34 and the N channel transistor 31 is used, and thus, as described later, the retained memory which is retained in the latch circuit 25 can be rewritten.

Figure 10:
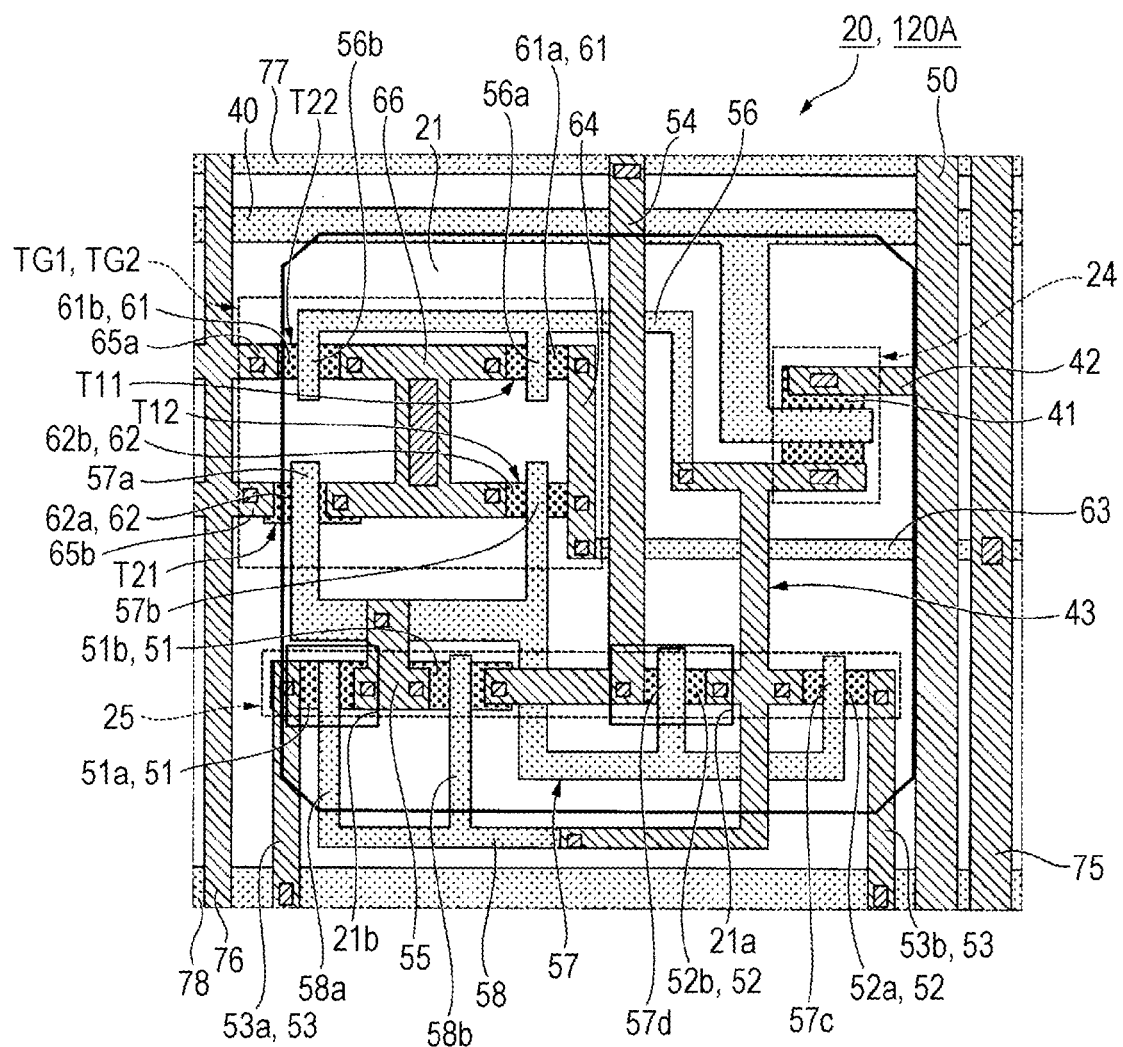
FIG. 10 is a planar view illustrating a configuration of a pixel circuit according to a second embodiment.

FIG. 10 is a planar view specifically illustrating a configuration of the pixel circuit 120A according to the present embodiment.

Pixel 20 has a laminated structure. As illustrated in FIG. 10, a semiconductor layer is provided on a first layer of a bottom layer. In addition, various wires are formed on a second layer which is an upper layer of the first layer, and on a third layer which is an upper layer of the second layer. In addition, the pixel electrode 21 is formed on a fourth layer. Each layer is insulated by insulating layers (not illustrated).

The wires formed in the periphery of the pixel 20 will be first described. The scan line 40, the data line 50, the high potential power supply line 78, the low potential power supply line 77, the first control line 75, and the second control line 76 are provided in the periphery of the pixel 20. Such wires are formed over the plurality of pixels 20. Among those, the scan line 40 and the data line 50 are orthogonal to each other on an upper right corner of the pixel 20 in FIG. 10.

In addition, the high potential power supply line 78 and the low potential power supply line 77 are disposed in parallel in a vertical direction of the pixel 20 in FIG. 10. The first control line 75 and the second control line 76 are disposed to oppose each other in a horizontal direction of the pixel 20 in FIG. 10. Among the wires, the scan line 40, the low potential power supply line 77 and the high potential power supply line 78 are formed on the same layer (second layer), and the data line 50, the first control line 75 and the second control line 76 are formed on the same layer which is a higher layer (third layer) than the second layer.

Next, the wires provided within the pixel 20 and a configuration of the semiconductor layer will be described. The semiconductor layers 41, 51, 52, 61, 62, and 62 are formed on the first layer which is a bottom layer, in the pixel 20. The semiconductor layers are all formed of semiconductor material such as silicon or the like. In addition, of course it is acceptable that each semiconductor layer may be formed of material other than silicon.

In the present embodiment, the semiconductor layer 51 includes a first semiconductor layer 51a and a second semiconductor layer 51b. The semiconductor layer 52 includes a first semiconductor layer 52a and a second semiconductor layer 52b. The semiconductor layer 61 includes a first semiconductor layer 61a and a second semiconductor layer 61b. The semiconductor layer 62 includes a first semiconductor layer 62a and a second semiconductor layer 62b. The semiconductor layers 41, 51, 52, 61, and 62 are formed in an island shape so as to be separated from each other.

The wires 56, 57, 58, and 63 are formed on the second layer which is an upper layer of the first layer. Such wires consist of metal with high conductivity, such as copper, aluminum, silver or the like.

A wire 56 includes a branch portion 56a which is provided so as to overlap with the first semiconductor layer 61a in a planar view, and a branch portion 56b which is provided so as to overlap with the second semiconductor layer 61b in a planar view. The P channel transistor T11 is configured with the first semiconductor layer 61a, the branch portion 56a, and a gate insulating layer which is disposed between the first semiconductor layer 61a and the branch portion 56a. The N channel transistor T22 is configured with the second semiconductor layer 61b, the branch portion 56b, and a gate insulating layer which is disposed between the second semiconductor layer 61b and the branch portion 56b.

A wire 57 includes a branch portion 57a which is provided so as to overlap with the first semiconductor layer 62a in a planar view, a branch portion 57b which is provided so as to overlap with the second semiconductor layer 62b in a planar view, a branch portion 57c which is provided so as to overlap with the first semiconductor layer 52a in a planar view, and a branch portion 57d which is provided so as to overlap with the second semiconductor layer 52b in a planar view. The P channel transistor T21 is configured with the first semiconductor layer 62a, the branch portion 57a, and a gate insulating layer which is disposed between the first semiconductor layer 62a and the branch portion 57a. The N channel transistor T12 is configured with the second semiconductor layer 62b, the branch portion 57b, and a gate insulating layer which is disposed between the second semiconductor layer 62b and the branch portion 57b.

A wire 58 includes a branch portion 58a which is provided so as to overlap with the first semiconductor layer 51a in a planar view, and a branch portion 58b which is provided so as to overlap with the second semiconductor layer 51b in a planar view. The latch circuit 25 is configured with the semiconductor layers 51 and 52, and the wires 57 and 58.

The wire 63 configures a portion of a wire for connecting the first control line 75 to the transistors T11 and T12. The wire 63 is connected to the first control line 75 via a contact hole.

The wires 42, 43, 53, 54, 55, 64, 65, and 66 are formed on the third layer which is an upper layer of the second layer. Such wires consist of the same material as that of the wire formed on the second layer, for example, metal with high conductivity, such as copper, aluminum, silver or the like.

The wire 42 is a portion which is protruded in a left direction of FIG. 10 towards an inside of the pixel 20 from the data line 50, and is connected to one end portion of the semiconductor layer 41 via a contact hole.

The wire 43 is connected to both the other end portion of the semiconductor layer 41 and an end portion of the wire 58 via a contact hole. In addition, the wire 43 is connected to both the other end portion of the semiconductor layer 41 and the wire 56 via a contact hole.

The wire 53 includes the wire 53a which connects the high potential power supply line 78 to the first semiconductor layer 51a, and the wire 53b which connects the high potential power supply line 78 to the first semiconductor layer 52a. The wire 53 is connected to the first semiconductor layers 51a and 52a via a contact hole.

The wire 54 is a wire which connects the low potential power supply line 77 to the second semiconductor layer 52b and the second semiconductor layer 51b. The wire 54 is connected to the second semiconductor layers 51b and 52b via a contact hole.

The wire 55 is respectively connected to the first semiconductor layers 51a, the second semiconductor layer 51b, and the wire 57 via a contact hole.

The wire 64 is a wire which connects the first semiconductor layer 61a and the second semiconductor layer 62b to the wire 63. The wire 64 is respectively connected to the first semiconductor layer 61a, the second semiconductor layer 62b, and the wire 63 via a contact hole. The wire 65 includes the wire 65a which connects the second control line 76 to the transistor (N channel transistor) T22, and the wire 65b which connects the second control line 76 to the transistor (P channel transistor) T21. The wires 65a and 65b are respectively connected to the second semiconductor layer 61b and the first semiconductor layer 62a via a contact hole.

The wire 66 is respectively connected to the first semiconductor layers 61a and 62a, and the second semiconductor layers 61b and 62b via a contact hole. Furthermore, the wire 66 is connected to the pixel electrode 21 formed on the upper layer (fifth layer) via a contact hole.

Each layer is configured in this way, and thereby, the transfer gates TG1 and TG2 are configured with the semiconductor layers 61 and 62, the wires 56, 57, 64 and 66, and an insulating layer (not illustrated) formed between the first layer and the second layer.

In addition, a portion overlapped with a portion of the scan line 40 in the semiconductor layer 41 in a planar view, becomes a channel area, and a portion connected to the data line 50 via the wire 42 becomes a source area, and a portion connected to the wire 43 becomes a drain area. A portion (extended portion) overlapped with the semiconductor layer 41 in the scan line 40 in a planar view configures a gate electrode of the selection transistor 24.

In addition, the latch circuit 25 is configured using the semiconductor layers 51 and 52, and the wires 53, 55, 57, 58 and 57 as a main body. While not being illustrated, the N channel transistor 31 and P channel transistor 32 of the latch circuit 25 are configured with the semiconductor layer 51, and the N channel transistor 33 and P channel transistor 34 of the latch circuit 25 are configured with the semiconductor layer 52.

Furthermore, the p channel transistor T11 of field effect type is configured using the first semiconductor layer 61a as a main body, and the N channel transistor T12 of field effect type is configured using the second semiconductor layer 62b as a main body. The N channel transistor T22 of field effect type is configured using the second semiconductor layer 61b as a main body, and the P channel transistor T21 of field effect type is configured using the first semiconductor layer 62a as a main body. That is, the transfer gates TG1 and TG2 are configured with the first semiconductor layer 61a, the second semiconductor layer 62b, and the wires 56, 57, 64 and 66.

When the pixel 20 such as that described above is formed, the first layer to the fourth layer may be sequentially laminated.

In the present embodiment, the pixel electrode 21 is formed so as to overlap with the latch circuit 25 in a planar view. Furthermore, the pixel electrode is disposed in such a manner that openings 21a and 21b are formed in the pixel electrode 21, the opening 21a overlaps with the P channel transistor 34 being used as a light sensor, and the opening 21b overlaps with a portion corresponding to the N channel transistor 31. As a result, the P channel transistor 34 and the N channel transistor 31 can satisfactorily incorporate the light incident from an upper surface side of the pixel electrode 21. In addition, when visible light is emitted from the light pen 90 (refer to FIG. 5), the visible light filter 23 may be provided in the opening 21a, in the same manner as in the first embodiment.

Subsequently, an operation of the electrophoretic display device including the pixel circuit according to the present embodiment will be described.

Figure 11:
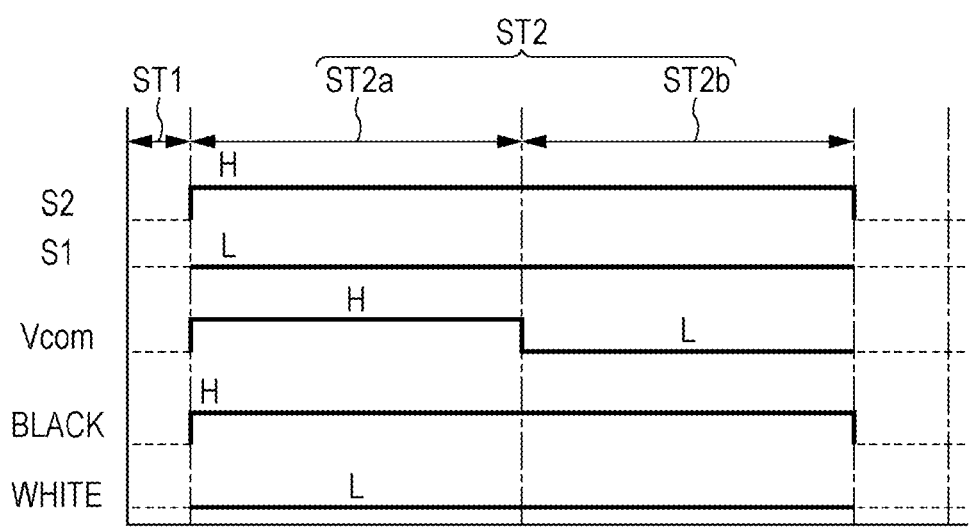
FIG. 11 is a timing diagram at the time of driving a pixel.

FIG. 11 is a timing diagram at the time of driving one pixel 20 in the present embodiment. As illustrated in FIG. 11, in the present embodiment, each pixel 20 operates in a sequence of an image signal input period ST1 and an image writing period ST2, thereby generating an image. In addition, in FIG. 11, a potential which is input to the pixel electrode 21 of the pixel 20 which performs black display is referred to as "Black", and a potential which is input to the pixel electrode 21 of the pixel 20 which performs white display is referred to as "White".

During the image signal input period ST1, image data is input to the latch circuit 25 from the data line 50. Here, during the image signal input period ST1, the control signal S1 from the first control line 75, and the control signal S2 from the second control line 76 are set to the same potential (0 V) as the potential Vcom of the counter electrode 22.

Specifically, in the pixel 20 having the above-described configuration, if image data with a low level is input to the latch circuit 25 from the data line 50 via the selection transistor 24, the input terminal N1 of the latch circuit 25 is retained as a low level, and the first output terminal N2 is retained as a high level, as described above.

In this case, the latch circuit 25 is in a memory state corresponding to a case where the pixel 20 performs white display. In this memory state, only the P channel transistor T11 and the N channel transistor T12 which configure the transfer gate TG1 turn on. As a result, the pixel electrode 21 is electrically connected to the first control line 75. Then, a potential (control signal S1) corresponding to the first control line 75 can be input to the pixel electrode 21.

Meanwhile, if image data with a high level is input to the latch circuit 25 from the data line 50 via the selection transistor 24, the input terminal N1 is retained as a high level, and the first output terminal N2 is retained as a low level.

In this case, the latch circuit 25 enters a memory state corresponding to a case where the pixel 20 performs black display. In this memory state, only the P channel transistor T21 and the N channel transistor T22 which configure the transfer gate TG2 is turned on. As a result, the pixel electrode 21 is electrically connected to the second control line 76. Then, a potential (control signal S2) corresponding to the second control line 76 can be input to the pixel electrode 21.

In the same manner as in the first embodiment, the data line 50 and the scan line 40 are sequentially selected, and thus, the latch circuits 25 of all pixels 20 can be in a memory state corresponding to the image data.

After memory setting is completed with respect to all pixels 20, the operation proceeds to the image writing period ST2. As illustrated in FIG. 11, the image writing period ST2 is divided into a first half portion ST2a and a second half portion ST2b. During the first half portion ST2a of the image writing period ST2, the control signal S1 from the first control line 75 is set to a potential (L) of, for example, 0 V, and the control signal S2 from the second control line 76 and the potential Vcom of the counter electrode 22 are respectively set to the same positive potential, for example, a potential (H) of 15 V. In this case, a potential of 0 V corresponding to the control signal S1 is input to the pixel electrode 21 of the pixel 20 which performs white display, and a potential of 15 V is input to the counter electrode 22. For this reason, the counter electrode 22 becomes a high potential with respect to the pixel electrode 21, the white particles 82 of the pixel 20 move to the counter electrode 22 side, the black particles 83 move to the pixel electrode 21 side, and white display is exhibited (refer to FIG. 7A).

Meanwhile, since the potential of 15 V corresponding to the control signal S2 is input to the pixel electrode 21 of the pixel 20 that is desired to perform black display, the pixel electrode 21 and the counter electrode 22 receive together the potential of 15 V. For this reason, the electrophoretic particles (white particles 82 and black particles 83) do not move.

During the second half portion ST2b of the image writing period ST2, the potential Vcom of, for example, 0 V corresponding to a signal with a low level is input to the counter electrode 22. In this case, a potential of 0 V corresponding to the control signal S1 is input to the pixel electrode 21 of the pixel 20 that is desired to perform white display, and the potential of 0 V is input to the counter electrode 22. For this reason, the electrophoretic particles (white particles 82 and the black particles 83) do not move.

Meanwhile, since a potential of 15 V corresponding to the control signal S2 is input to the pixel electrode 21 of the pixel 20 that is desired to perform black display, the counter electrode 22 becomes a low potential with respect to the pixel electrode 21, the black particles 83 of the pixel 20 move to the counter electrode 22 side, the white particles 82 move to the pixel electrode 21 side, and black display is exhibited (refer to FIG. 7B).

As described above, the pixel 20 in which the potential (L) of 0 V from the first control line 75 is input to the pixel electrode 21 displays white, and the pixel 20 in which the potential (H) of 15 V from the second control line 76 is input to the pixel electrode 21 displays black.

According to the present embodiment, compared to the second embodiment, in the pixel 20 which does not change display, a potential difference between the pixel electrode 21 and the counter electrode 22 is 0 V, and thus, it is possible to reliably prevent the electrophoretic particles (white particles 82 and black particles 83) from moving, and to perform a high quality display with less blur.

Subsequently, in the electrophoretic display device according to the present embodiment, a case of performing light input will be described. Hereinafter, for the sake of a brief description, it is assumed that when light input is performed, all pixels 20 of the display portion 3 perform white display. That is, in a memory state of the latch circuits 25 of all pixels 20, the input terminal N1 of the latch circuit 25 is retained as a low level, and the first output terminal N2 of the latch circuit 25 is retained as a high level.

If the light pen 90 (refer to FIG. 5) approaches the display portion 3, the light LT (refer to FIG. 5) of the light pen 90 is incident to the P channel transistor 34 and the N channel transistor 31 of the pixel 20. At this time, the P channel transistor 34 and the N channel transistor 31 are turned on by a light leakage current being flowed. If the P channel transistor 34 and the N channel transistor 31 turn on, the P channel transistor 32 and the N channel transistor 33 are turned off, and the input terminal N1 of the latch circuit 25 is rewritten as a high level, and the first output terminal N2 of the latch circuit 25 is rewritten as a low level. That is, the latch circuit 25 is rewritten in such a manner that the memory state of the pixel 20 becomes a black display state by the light input of the light pen 90. As a result, the pixel 20 to which light is incident is selectively changed from white display to black display, and a black mark is written to the display portion 3. By doing so, the display state of the display portion 3 is changed to a black display state, and thus, the trajectory of the light pen 90 can be displayed.

In the present embodiment, after moving of the electrophoretic particles is completed, a continual voltage application is not required. For this reason, when the light pen 90 is in contact with the display portion 3, either the light pen 90 or the electrophoretic display device 101 generates a signal which transfers the fact, and thus, the trajectory may be automatically made to black display, by setting a potential of the control signal S2, which is synchronized to the signal, to 15 V only for a predetermined time.

In addition, a reading operation of the coordinate data from the memory 39, which is performed by the controller 200, is the same as that of the above-described embodiment, and thus, description thereof will be omitted.

As described above, even in the electrophoretic display device according to the present embodiment, an input state of a potential with respect to the pixel electrode 21 is controlled by the light input, and thus, it is possible to quickly display the trajectory produced by handwriting using the light pen 90 or the like. In addition, it is possible to read the coordinate data from the latch circuit 25.

In addition, since a portion of a transistor which configures the latch circuit 25 is used as the light sensor, it is possible to reduce the number of components.

In addition, in the present embodiment, since a memory is configured with the latch circuit 25 which is a digital circuit, the electrophoretic display device does not malfunction even when being miniaturized, and in addition, with a fast response, the electrophoretic display device can be used for high resolution and a fast pen speed.

In addition, it is preferable that a dispersion medium which emits infrared from the light pen 90 and configures an electrophoretic element, and at least one configuration member of particles be configured by a member with characteristic of transmitting infrared light, and according to this, it is possible to prevent malfunction caused by visible light from occurring. For example, if azomethine-based pigment particles are used as the black particles 83, permeability at an infrared area becomes greater. In addition, as the white particles 82, particles which cover the surface of pigment with a synthetic resin such as titania with a primary particle diameter of approximately 20 nm to 50 nm or rutin, also has a higher permeability at an infrared area. By using the above-described particles for a portion of electrophoretic particles, it is easy to transmit selectively infrared regardless of a display state. Thus, wavelength which is easy to selectively transmit is used as the wavelength of a light source of a light pen, and thus, even by reducing the intensity of a light source, in other words, energy consumption, it is possible to perform a writing operation.

In addition, when tracing with a light pen, that is, when trajectory display is not required, while writing is performed by the light pen 90, the first control line 75 and the second control line 76 may be in a disconnection state (high impedance state). Then, after light input is ended, a memory state of the latch circuit 25 is read and thereby a trajectory may be displayed in the display portion 3 thereafter.

Figure 12:
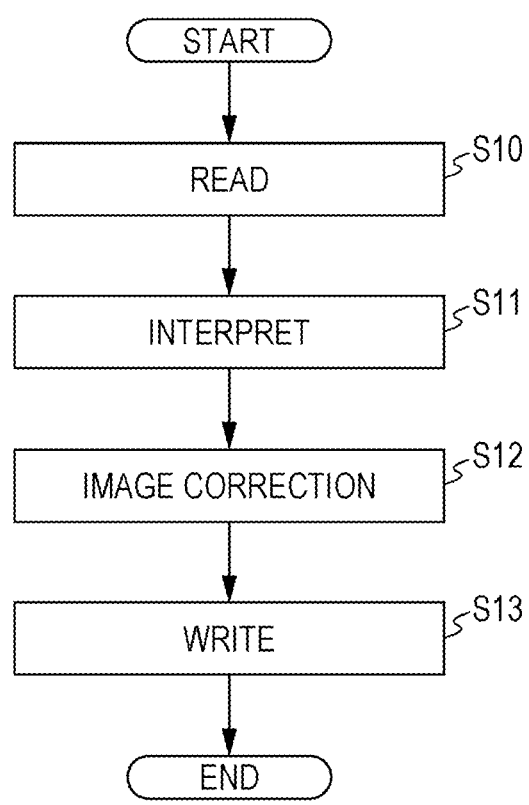
FIG. 12 is a chart illustrating flow of a trajectory correction operation.

In addition, that is, even when the trajectory display is not required, characters or shapes which are input by a light pen may be corrected. In this case, the processing illustrated in a flow illustrated in FIG. 12 may be performed. FIG. 12 is a chart illustrating the flow of a trajectory correction operation of the electrophoretic display device 101. The controller 200 first reads memory information of each pixel 20 which is rewritten by the light pen (step SS10). Subsequently, the controller 200 transmits the read memory information to a top device. The top device interprets the read memory information (step SS11). Based on the interpreted result, the top device corrects the characters or shapes which are input by the light pen (step SS12). The top device transmits image data of post-correction to the controller 200. The controller 200 resets the memory information which is input by the light pen and is rewritten. Thereafter, based on the corrected image data, the controller 200 writes the characters or shapes which are input, to the pixel 20 of the display portion 3 (step SS13). According to such a flow, by shaping the characters or shapes which are input by the light pen, it is possible to display the characters or shapes on the display portion 3.

In addition, in the above-described embodiment, a case of being switched to the pixel 20 of black display as a trajectory is taken as an example, while not being limited to this, and the pixel 20 of white display may be used as a trajectory.

In addition, in the above-described embodiment, a case of using both the P channel transistor 34 and the N channel transistor 31 which configure the latch circuit 25, as the light sensor, is exemplified, but in order to achieve an object to improve sensitivity or the like, another light sensor may be added in parallel to such transistors.

In addition, in the first embodiment, a case of configuring the light sensor 38 with photo diodes is taken as an example, but a configuration (configuration in which a source terminal and a gate terminal are disconnected) in which transistors are diode-connected may be employed. By using such a configuration, an electrode structure which is the same as that of a pixel circuit of an active matrix can be used, and thus, it becomes a configuration in which a structure can be simplified, productivity is excellent, and cost is reduced.

Figure 13:
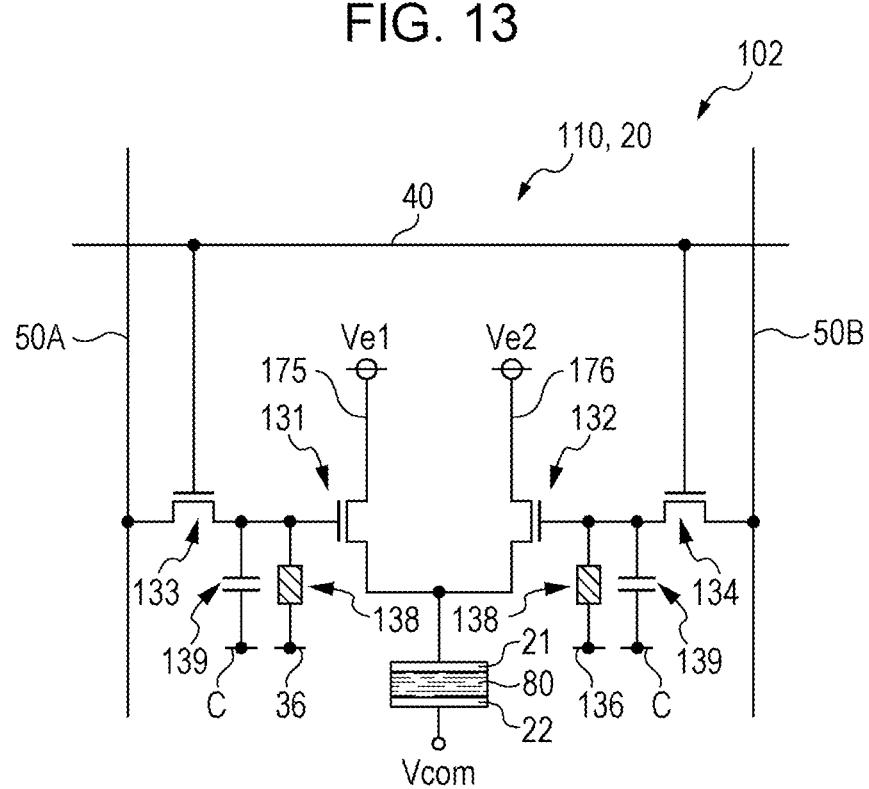
FIG. 13 is a circuit diagram illustrating a configuration of a pixel circuit according to another embodiment.

In addition, the configuration of the pixel circuit is not limited to the configuration according to the above-described embodiment. For example, the invention can be applied to the electro-optical device which includes the pixel circuit such as that illustrated in FIG. 13. The electro-optical device is the electrophoretic display device 102 which includes the electrophoretic layer 280 as an electro-optical layer. In addition, FIG. 13 illustrates a pixel circuit 110 in the pixel 20 of, for example, a first row and a first column among the plurality of pixels 20. The configurations of each pixel circuit 110 are the same, and thus, hereinafter, the pixel circuit 110 of the first row and the first column will be representatively described. Description of the other pixel circuits 110 will be omitted.

The pixel circuit 110 includes a TFT 131 (first transistor), a TFT 132, (second transistor), a TFT 133 (third transistor), and a TFT 134 (fourth transistor). A gate of the TFT 133 is connected to the scan line 40, and a source of the TFT 133 is connected to the first data line 50A. A gate of the TFT 134 is connected to the scan line 40, and a source of the TFT 134 is connected to the second data line 50B.

A gate of the TFT 131 is connected to the a drain of the TFT 133, and a first potential Ve1 is input to a source of the TFT 131 by the first control line 175. A gate of the TFT 132 is connected to the a drain of the TFT 134, and a second potential Vet is input to a source of the TFT 132 by the second control line 176. In addition, a drain of the TFT 131 and a drain of the TFT 132 are connected to the pixel electrode 21.

In addition, the memory 139 is provided between the gate of the TFT 131 and the drain of the TFT 133, and between the gate of the TFT 132 and the drain of the TFT 134. In addition, the light sensor 138 is provided between the memory 139 and the gate of the TFT 131, and between the memory 139 and the gate of the TFT 132.

A signal line 136 is connected to the other end of the light sensor 138, one end of which is connected to the gate of the TFT 131. An off-potential which turns off the TFT 131 is supplied to the signal line 136. In addition, the signal line 136 is connected to the other end of the light sensor 138, one end of which is connected to the gate of the TFT 132. An on-potential which turns on the TFT 132 is supplied to the signal line 136.

Next, a driving method of a case of performing black display of the pixel 20, and a driving method of a case of performing white display of the pixel 20 will be described. When an image is displayed on the pixel 20, the potential Vcom is input to the counter electrode 22. Here, the first potential Ve1 is a potential lower than the potential Vcom, and the second potential Vet is a potential higher than the potential Vcom.

For example, when the pixel 20 of the first row and the first column is set as white, the data line driving circuit (not illustrated) supplies a data signal with an H level to the first data line 50A of the first column, and supplies a data signal with an L level to the second data line 50B of the first column. If the first data line 50A becomes an H level in a state where the TFT 133 is turned on, the gate of the TFT 131 becomes an H level, and thereby the TFT 131 is turned on.

In addition, if the second data line 50B becomes an L level by the TFT 134 which is turned on, the gate of the TFT 132 becomes an L level, and thereby the TFT 132 is turned off.

If the TFT 131 is turned on and the TFT 132 is turned off, the first potential Ve1 is input to the pixel electrode 21 by a first control line 175. Here, the potential of the pixel electrode 21 is lower than the potential Vcom which is input to the counter electrode 22, and thus, in the electrophoretic layer 280, for example, white electrophoretic particles which are negatively charged move to the counter electrode 22 side, and black electrophoretic particles which are positively charged move to the pixel electrode 21 side.

Meanwhile, for example, when the pixel 20 of the first row and the first column is set as black, while the scan line 40 of the first row is at an H level, the data line driving circuit (not illustrated) supplies a data signal with an L level to the first data line 50A of the first column, and supplies a data signal with an H level to the second data line 50B of the first column. While the scan line 40 is in an H level, if the first data line 50A becomes an L level in a state where the TFT 133 is turned on, the gate of the TFT 131 becomes an L level, and thereby the TFT 131 is turned off. In addition, while the scan line 40 is in an H level, if the second data line 50B becomes an H level in a state where the TFT 134 is turned on, the gate of the TFT 132 becomes an H level, and thereby the TFT 132 is turned on. If the TFT 131 is turned off and the TFT 132 is turned on, the second potential Vet is input to the pixel electrode 21 by the second control line 176. Here, the potential of the pixel electrode 21 is a higher voltage than the potential Vcom which is input to the counter electrode 22, and thus, in the electrophoretic layer 280, for example, black electrophoretic particles which are positively charged move to the counter electrode 22 side, and white electrophoretic particles which are negatively charged move to the pixel electrode 21 side.

That is, when the pixel 20 performs white display or black display, the potential which is supplied to the first data line 50A is retained in the memory 139 provided between the TFT 133 and the TFT 131. That is, the potential which is supplied to the second data line 50B is retained in the memory 139 provided between the TFT 132 and the TFT 134.

Even in the pixel circuit 110 illustrated in FIG. 13, the light input is performed by the light pen, and thereby, it is possible to rewrite the retained data of the memory 139. That is, if light is irradiated into the light sensor 138, the pixel performs black display, in a state where the TFT 131 of the pixel is turned off and the TFT 132 is turned on. Thus, it is possible to display the trajectory which is input by the light pen. In addition, it is possible to read the data retained in the memory 139 via the first data line 50A and the second data line 50B.

In addition, when display of the pixel 20 is changed, a voltage is applied to the pixel electrode 21 only one time, and thus, it is possible to reduce power consumption. In addition, since a voltage which is applied to the pixel electrode 21 can be made different for each pixel 20, it is possible to change a certain pixel to black display and to change other pixels to white display, by selecting the scan line 40 only one time, with respect to the same pixel 20.

In addition, in the above-described embodiment, as an electro-optical device, an electrophoretic display device and a liquid crystal display device are taken as examples, while not being limited to this, and the invention may be applied to an organic EL display device which includes an organic EL layer as an electro-optical layer.

Modification Example

In the above-described embodiment, a form is described, in which the light emitted from a light pen is irradiated into a light sensor via an opening provided in the pixel electrode 21, while not being limited to this. A notch is provided in the pixel electrode 21, and the light emitted from a light pen may be irradiated into a light sensor via the notch.

In addition, in the embodiment, when a plurality of light sensors is disposed in a pixel, a form is described, in which a plurality of openings corresponding to the light sensors is provided in a pixel electrode, while not being limited to this. The openings may be provided so as to overlap with the plurality of light sensors in a planar view.

Electronic Apparatus

Next, a case where the electrophoretic display device according to the above-described embodiment is applied to an electronic apparatus will be described.

Figure 14A:
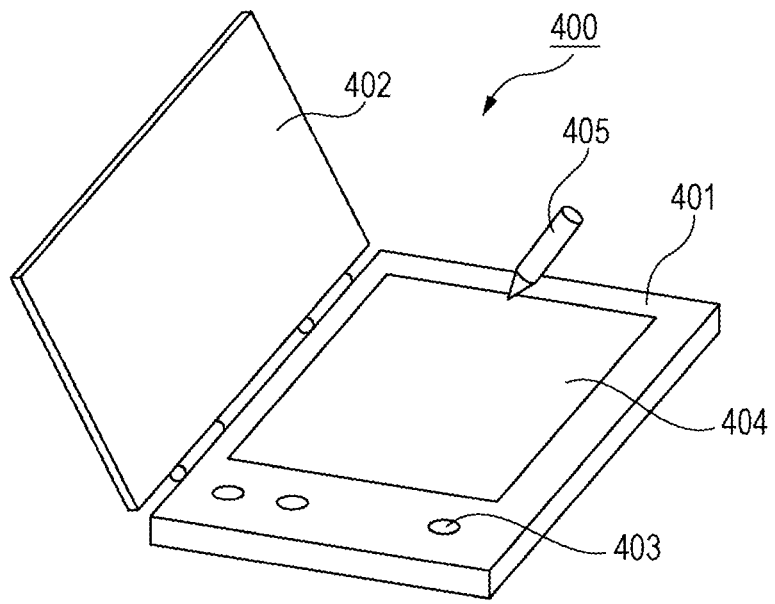
FIGS. 14A and 14B are views illustrating a configuration according to an example of an electronic apparatus.
Figure 14B:
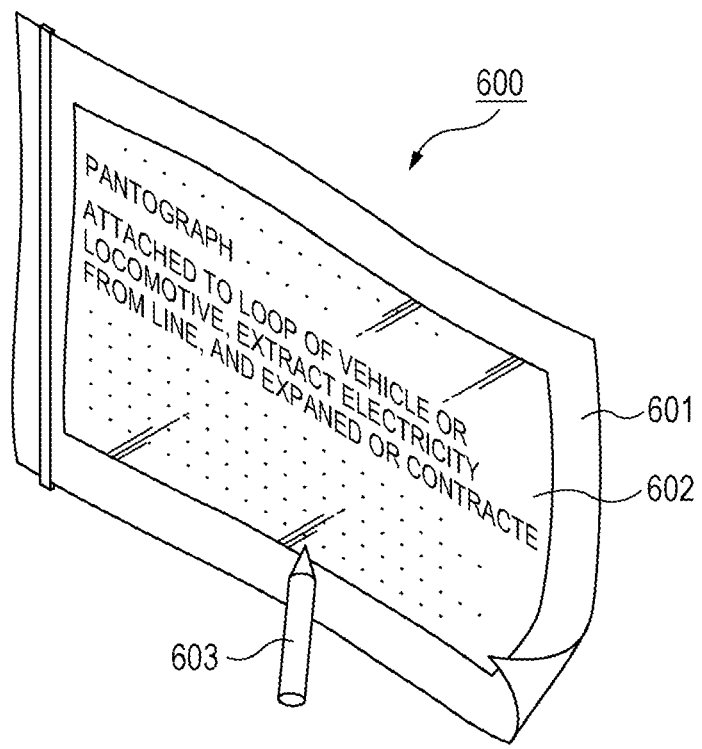

FIGS. 14A and 14B are perspective views for explaining a specific example of an electronic apparatus to which the electrophoretic display device according to the invention is applied.

FIG. 14A is a perspective view illustrating an electronic book which is an example of an electronic apparatus. The electronic book (electronic apparatus) 400 includes a frame 401 of book shape, a cover 402 which is provided to freely rotate (openable) with respect to the frame 401, an operation portion 403, a display portion 404 which is configured by the electrophoretic display device according to the invention, and a light pen 405.

FIG. 14B is a perspective view illustrating an electronic paper which is an example of an electronic apparatus. The electronic paper (electronic apparatus) 600 includes a body portion 601 which is configured by a rewritable sheet with both texture similar to that of paper and flexibility, a display portion 602 which is configured by the electrophoretic display device according to the invention, and a light pen 603.

For example, it is assumed that an electronic book, an electronic paper, or the like is used to repeatedly write characters on a background of white paper. According to the present embodiment, it is possible to display the trajectory created by the light pen 405 or 603.

In addition, a range of electronic apparatuses to which the electrophoretic display device according to the invention can be applied is not limited to this, and includes broadly a device using color change of visual sense caused by the moving of the charged particles.

According to the electronic book 400 and the electronic paper 600 which are described above, the electrophoretic display device according to the invention is employed, and thus, the electronic book 400 and the electronic paper 600 are high quality electronic apparatuses, each having high value addition and including handwriting input function.

In addition, the above-described electronic apparatus exemplifies an electronic apparatus according to the invention, and does not limit a technical range of the invention. It is possible to use appropriately the electrophoretic display device according to the invention even for, for example, a cellular phone, a display portion of an electronic apparatus such as a portable audio apparatus, a worksheet such as a manual, a textbook, an exercise book, information sheet, or the like.

The entire disclosure of Japanese Patent Application No. 2013-242310, filed Nov. 22, 2013 is expressly incorporated by reference herein.

What is claimed is:

1. A circuit substrate comprising:
   a pixel circuit that is provided for a pixel which is arranged in a display area provided on a substrate,
   wherein the pixel circuit includes:
   a pixel selection transistor;
   a data line that is connected to a source of the pixel selection transistor;
   a scan line that is connected to a gate of the pixel selection transistor;
   a pixel electrode;
   a memory unit that is connected to the pixel electrode and the pixel selection transistor, and that can switch an output state of a potential with respect to the pixel electrode; and
   a light sensor that can rewrite an output, which is retained in the memory unit by light input, with respect to the pixel electrode.

2. The circuit substrate according to claim 1, further comprising:
a driving transistor that is disposed between the pixel electrode and the pixel selection transistor, and that can switch an input state of a potential with respect to the pixel electrode,
wherein the light sensor and the memory are respectively provided between wires that connect a gate of the driving transistor to a drain of the pixel selection transistor.

3. The circuit substrate according to claim 2,
wherein the light sensor is configured to diode-connect the transistor.

4. An electro-optical device with input function comprising:
circuit substrate according to claim 3;
a counter substrate that has a counter electrode which is arranged so as to oppose a pixel electrode of the circuit substrate; and
an electro-optical material layer that is interposed between the circuit substrate and the counter electrode.

5. An electro-optical device with input function comprising:
circuit substrate according to claim 2;
a counter substrate that has a counter electrode which is arranged so as to oppose a pixel electrode of the circuit substrate; and
an electro-optical material layer that is interposed between the circuit substrate and the counter electrode.

6. An electronic apparatus comprising:
an electro-optical device with input function according to claim 5.

7. The circuit substrate according to claim 1,
wherein the light sensor is configured by a portion of a plurality of transistors that configures the memory unit.

8. An electro-optical device with input function comprising:
circuit substrate according to claim 7;
a counter substrate that has a counter electrode which is arranged so as to oppose a pixel electrode of the circuit substrate; and
an electro-optical material layer that is interposed between the circuit substrate and the counter electrode.

9. The circuit substrate according to claim 7, further comprising:
a switch circuit that is provided between the memory unit and the pixel electrode; and
a first control line and a second control line which are connected to the switch circuit,
wherein a potential is input to the pixel electrode via one of the first control line and the second control line, which is selected based on an output of the memory unit.

10. An electro-optical device with input function comprising:
circuit substrate according to claim 9;
a counter substrate that has a counter electrode which is arranged so as to oppose a pixel electrode of the circuit substrate; and
an electro-optical material layer that is interposed between the circuit substrate and the counter electrode.

11. The circuit substrate according to claim 1,
wherein the pixel electrode forms an opening, and
wherein the light sensor is disposed so as to overlap with the opening in a planar view.

12. An electro-optical device with input function comprising:
circuit substrate according to claim 11;
a counter substrate that has a counter electrode which is arranged so as to oppose a pixel electrode of the circuit substrate; and
an electro-optical material layer that is interposed between the circuit substrate and the counter electrode.

13. The circuit substrate according to claim 1, further comprising:
a filter that has a light blocking property with respect to light of visible light range, and that is provided at a position corresponding to the opening in a planar view.

14. An electro-optical device with input function comprising:
circuit substrate according to claim 13;
a counter substrate that has a counter electrode which is arranged so as to oppose a pixel electrode of the circuit substrate; and
an electro-optical material layer that is interposed between the circuit substrate and the counter electrode.

15. The circuit substrate according to claim 1, further comprising:
a reading unit that reads retained information of a potential of the memory unit via the data line.

16. An electro-optical device with input function comprising:
circuit substrate according to claim 15;
a counter substrate that has a counter electrode which is arranged so as to oppose a pixel electrode of the circuit substrate; and
an electro-optical material layer that is interposed between the circuit substrate and the counter electrode.

17. An electro-optical device with input function comprising:
circuit substrate according to claim 1;
a counter substrate that has a counter electrode which is arranged so as to oppose a pixel electrode of the circuit substrate; and
an electro-optical material layer that is interposed between the circuit substrate and the counter electrode.

18. An electronic apparatus comprising:
an electro-optical device with input function according to claim 17.

19. The electro-optical device with input function according to claim 17,
wherein the electro-optical material layer is an electrophoretic layer.

20. An electronic apparatus comprising:
an electro-optical device with input function according to claim 19.

* * * * *